(12) United States Patent
Okada

(10) Patent No.: US 10,969,564 B2
(45) Date of Patent: Apr. 6, 2021

(54) ZOOM LENS AND IMAGE PICKUP APPARATUS

(71) Applicant: CANON KABUSHIKI KAISHA, Tokyo (JP)

(72) Inventor: Takashi Okada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 16/218,913

(22) Filed: Dec. 13, 2018

(65) Prior Publication Data

US 2019/0196143 A1     Jun. 27, 2019

(30) Foreign Application Priority Data

Dec. 21, 2017     (JP) ................. 2017-245013

(51) Int. Cl.
| | |
|---|---|
| *G02B 13/18* | (2006.01) |
| *G02B 9/62* | (2006.01) |
| *G02B 13/06* | (2006.01) |
| *G02B 13/02* | (2006.01) |
| *G02B 15/14* | (2006.01) |
| *G02B 13/00* | (2006.01) |

(Continued)

(52) U.S. Cl.
CPC .............. *G02B 9/62* (2013.01); *G02B 13/02* (2013.01); *G02B 13/06* (2013.01); *G02B 15/1461* (2019.08); *G02B 5/005* (2013.01); *G02B 13/0045* (2013.01); *G02B 13/18* (2013.01); *G02B 15/14* (2013.01); *G02B 15/146* (2019.08); *G02B 15/20* (2013.01); *G02B 27/0025* (2013.01)

(58) Field of Classification Search
CPC .. G02B 13/0045; G02B 9/62; G02B 27/0025; G02B 13/18; G02B 5/005; G02B 15/20; G02B 13/06; G02B 15/14; G02B 13/02; G02B 15/1461; G02B 15/146
USPC ................. 359/676, 683–687, 713, 740, 757
See application file for complete search history.

(56) References Cited

U.S. PATENT DOCUMENTS

| 9,151,938 B2 | 10/2015 | Okada | |
|---|---|---|---|
| 2015/0338622 A1* | 11/2015 | Kuzuhara | ................. G02B 7/10 |
| | | | 359/683 |
| 2016/0062096 A1 | 3/2016 | Hatada | |

FOREIGN PATENT DOCUMENTS

| JP | 2003287680 A | 10/2003 |
|---|---|---|
| JP | 2016048355 A | 4/2016 |

OTHER PUBLICATIONS

Notice of Reasons for Refusal issued by the Japanese Patent Office dated Mar. 3, 2020 in corresponding Japanese Patent Application No. 2017-245013, with English translation.

* cited by examiner

*Primary Examiner* — Evelyn A Lester
(74) *Attorney, Agent, or Firm* — Carter, Deluca & Farrell LLP

(57) ABSTRACT

Provided is a zoom lens including: a positive first unit; a negative second unit; a positive third unit; a positive fourth unit; a positive fifth unit; and a sixth unit, wherein the first unit is moved toward the object side for zooming from wide angle end to telephoto end, and an interval between each pair of adjacent units is changed for zooming, wherein the fifth unit is moved for focusing, and wherein a focal length at wide angle end, a focal length of the fifth unit, an F-number of the zoom lens at wide angle end, a total length at wide angle end, a distance from a lens surface on the object side of the fifth unit to an image plane at wide angle end at infinity, and a movement amount of the fifth unit for (Continued)

zooming from wide angle end to telephoto end at infinity are appropriately set.

15 Claims, 13 Drawing Sheets

(51) Int. Cl.
  *G02B 27/00* (2006.01)
  *G02B 5/00* (2006.01)
  *G02B 15/20* (2006.01)

ZOOM LENS AND IMAGE PICKUP APPARATUS

BACKGROUND OF THE INVENTION

Field of the Invention

The present invention relates to a zoom lens and an image pickup apparatus, which are particularly suitable as an image pickup optical system for a digital camera, a video camera, or other image pickup apparatus having high performance and a small size as the entire system.

Description of the Related Art

In recent years, there are increased demands for high performance and downsizing of the entire apparatus on an image pickup apparatus using an image pickup element. In particular, there is an increased demand for an image pickup apparatus having a small size as a whole and high image quality by increasing the size of the image pickup element.

Hitherto, in order to achieve the increased image quality and downsizing of the image pickup apparatus at the same time, a retractable zoom lens is often used as an image pickup optical system. In the retractable zoom lens, an interval between each pair of lens units in a state of taking no image is reduced to an interval that is different from that in a state of taking an image, to thereby reduce a thickness as the entire image pickup apparatus.

Meanwhile, when the image pickup element is increased in size, a pixel pitch and the like are also increased, and an amount of light that can be captured by one pixel is increased, with the result that noise is reduced, and an increase in image quality of a zoom lens is easily achieved. At this time, the zoom lens is increased in focal length in proportion to the size of the image pickup element. When the focal length is increased, an image having a shallow depth of field is easily taken.

In general, when the focal length is increased, a total length of the zoom lens and various aberrations of the zoom lens are also increased by a proportional factor. Therefore, with the same zoom lens as that for a case in which an image pickup element having a small size is used, it becomes difficult to suppress various aberrations to be small, and a zoom lens having a smaller size and high performance is required. Further, a photographing distance is also increased in proportion to the size of the image pickup element, and hence it is required that a proximity photographing distance be short.

As a zoom lens that satisfies those requirements, there has been known a positive-lead type zoom lens in which a lens unit having a positive refractive power is arranged closest to an object side (U.S. Patent Application Publication No. 2016/0062096).

In U.S. Patent Application Publication No. 2016/0062096, there is disclosed a zoom lens consisting of, in order from an object side to an image side, first to sixth lens units having positive, negative, positive, positive, positive, and negative refractive powers, respectively.

In many image pickup apparatus, in order to reduce the thickness of the image pickup apparatus in the state of taking no image, a lens barrel is divided into several stages using a retracting system to fold the lens units in an optical axis direction for storage. In general, in the retracting system, a mechanical mechanism regarding focusing is increased in size to significantly affect the thickness of the image pickup apparatus in a retracted state. Therefore, in order to effectively reduce the thickness of the zoom lens when used with the image pickup apparatus while securing high optical performance over an overall object distance, it is important to appropriately set the number of lens units forming the zoom lens and lens configurations of the respective lens units. It is further important to appropriately set a configuration of a lens unit for focusing and other factors.

It is particularly important to appropriately set movement conditions of a first lens unit for zooming, a refractive power and a position on an optical axis of the lens unit for focusing, a movement amount of the lens unit for focusing for zooming, and other factors.

SUMMARY OF THE INVENTION

According to one embodiment of the present invention, there is provided a zoom lens including, in order from an object side to an image side: a first lens unit having a positive refractive power; a second lens unit having a negative refractive power; a third lens unit having a positive refractive power; a fourth lens unit having a positive refractive power; a fifth lens unit having a positive refractive power; and a sixth lens unit, wherein the first lens unit is configured to move toward the object side for zooming from a wide angle end to a telephoto end, and an interval between each pair of adjacent lens units is changed for zooming, wherein the fifth lens unit is configured to move for focusing, and wherein the following conditional expressions are satisfied:

$$2.0 < f5/fw < 10.0;$$

$$0.1 < Fnow*D5iw/Lw < 0.8; \text{ and}$$

$$0.05 < M5/Lw < 0.30,$$

where "fw" represents a focal length of the zoom lens at the wide angle end, f5 represents a focal length of the fifth lens unit, Fnow represents an F-number of the zoom lens at the wide angle end, Lw represents a total length of the zoom lens at the wide angle end, D5iw represents a distance from a lens surface on the object side of the fifth lens unit to an image plane at the wide angle end when the zoom lens is focused at infinity, and M5 represents a movement amount of the fifth lens unit for zooming from the wide angle end to the telephoto end when the zoom lens is focused at infinity.

Further features of the present invention will become apparent from the following description of exemplary embodiments with reference to the attached drawings.

DESCRIPTION OF THE EMBODIMENTS

Now, a zoom lens and an image pickup apparatus including the zoom lens according to Embodiments of the present invention are described. The zoom lens according to each of Embodiments of the present invention includes, in order from an object side to an image side: a first lens unit having a positive refractive power; a second lens unit having a negative refractive power; a third lens unit having a positive refractive power; a fourth lens unit having a positive refractive power; a fifth lens unit having a positive refractive power; and a sixth lens unit having a positive or negative refractive power. An interval between each pair of adjacent lens units is changed for zooming.

Herein, as to the term "lens unit" in Embodiments of the present invention, a lens unit having a minimum configuration and is configured to move for zooming is regarded as one lens unit. In other words, a lens unit configured to perform sub-unit focusing, in which focusing is performed with a part of lenses in the lens unit, or perform sub-unit image stabilization, in which image stabilization is performed with a part of the lenses in the lens unit, is regarded as one lens unit. Moreover, as to an optical system configured to operate a part of the lens units, a plurality of lens units configured to move in the same manner for zooming are regarded as one lens unit.

Figure 1:
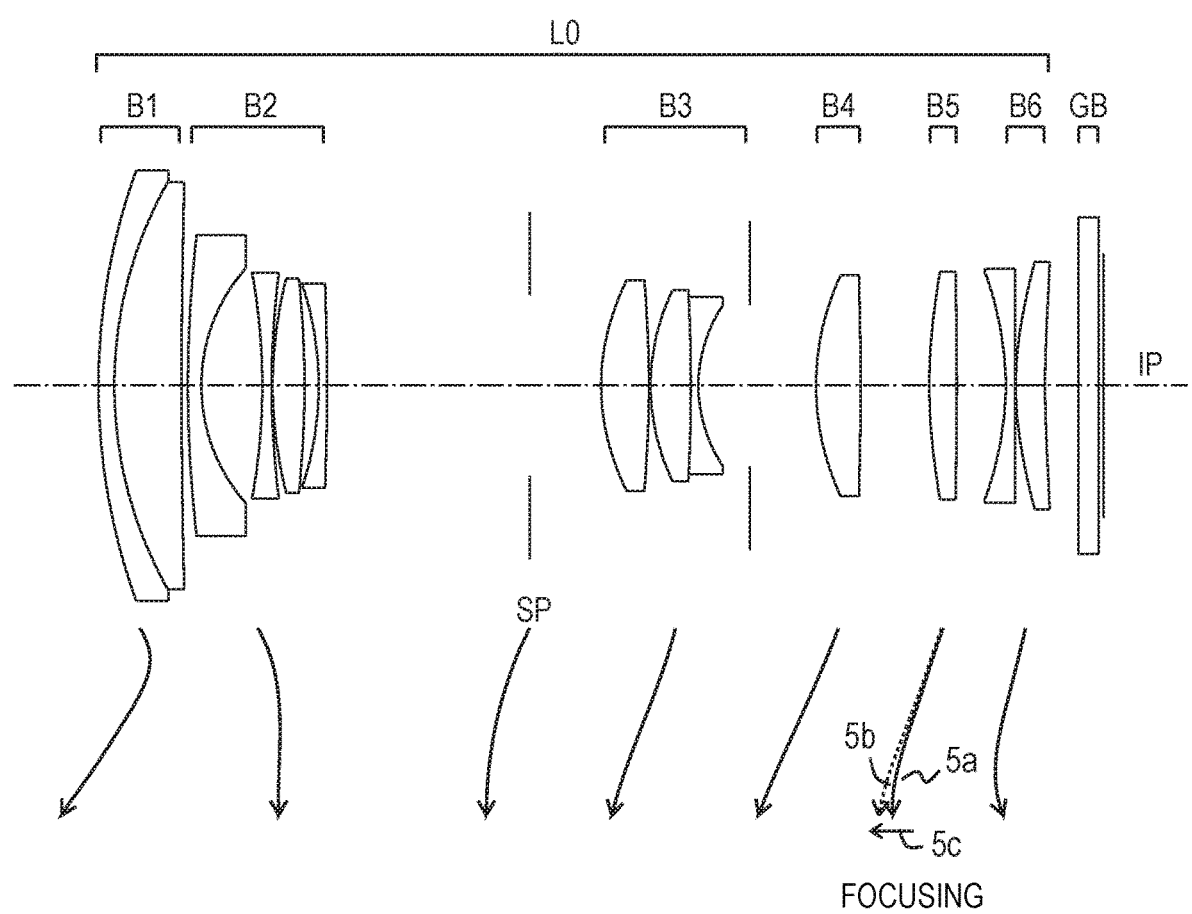
FIG. 1 is a lens cross-sectional view of a zoom lens according to Embodiment 1 of the present invention at a wide angle end.
Figure 2A:
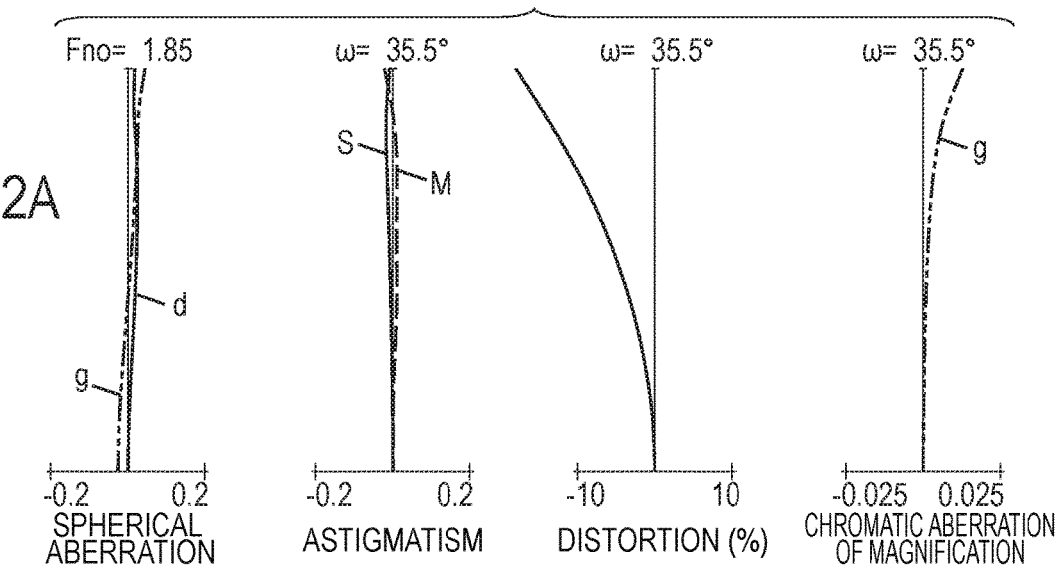
FIG. 2A is an aberration diagram of the zoom lens according to Embodiment 1 at the wide angle end.
Figure 2B:
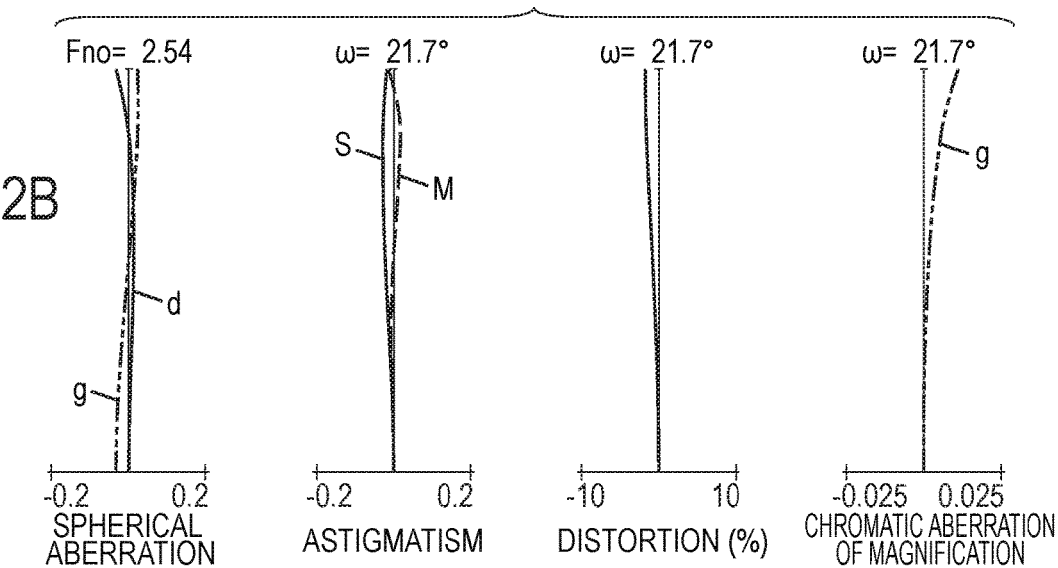
FIG. 2B is an aberration diagram of the zoom lens according to Embodiment 1 at an intermediate zoom position.
Figure 2C:
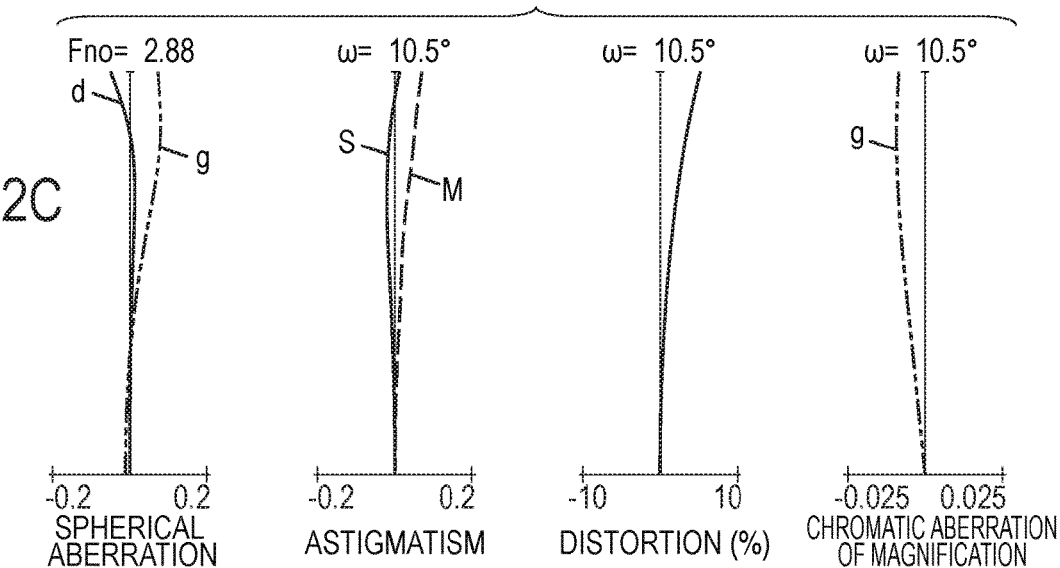
FIG. 2C is an aberration diagram of the zoom lens according to Embodiment 1 at a telephoto end.

FIG. 1 is a lens cross-sectional view of a zoom lens according to Embodiment 1 of the present invention at a wide angle end (short focal length end). FIG. 2A, FIG. 2B, and FIG. 2C are aberration diagrams of the zoom lens according to Embodiment 1 at the wide angle end, an intermediate zoom position, and a telephoto end (long focal length end), respectively.

Figure 3:
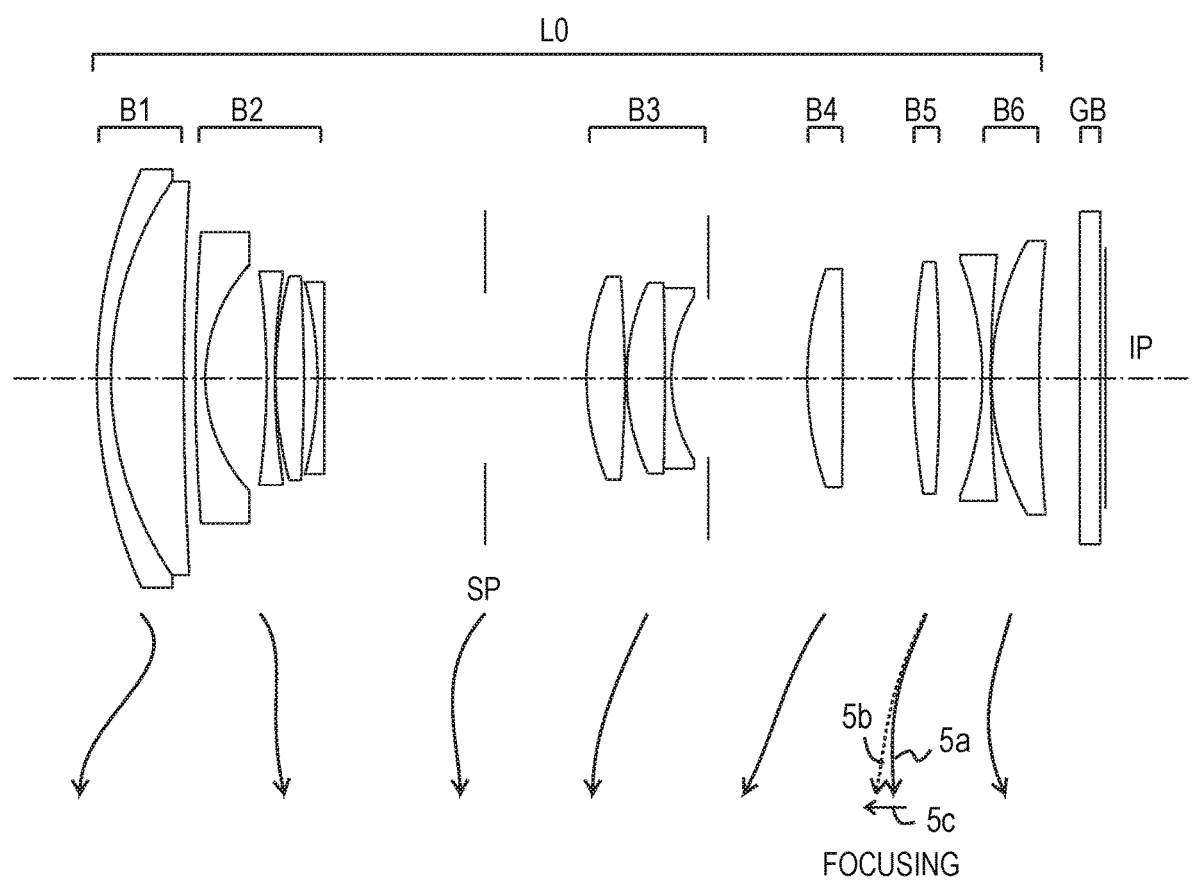
FIG. 3 is a lens cross-sectional view of a zoom lens according to Embodiment 2 of the present invention at a wide angle end.
Figure 4A:
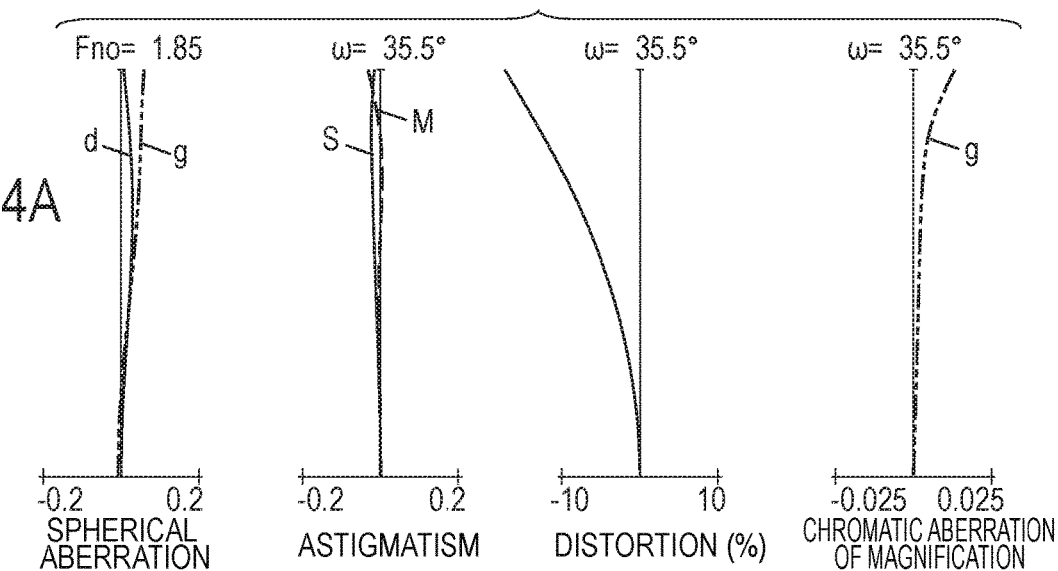
FIG. 4A is an aberration diagram of the zoom lens according to Embodiment 2 at the wide angle end.
Figure 4B:
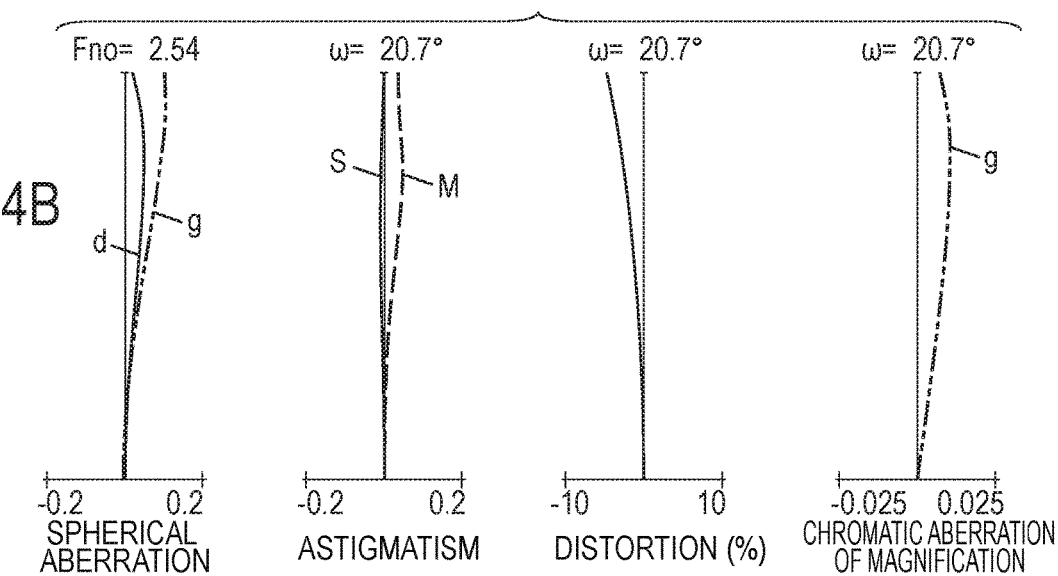
FIG. 4B is an aberration diagram of the zoom lens according to Embodiment 2 at an intermediate zoom position.
Figure 4C:
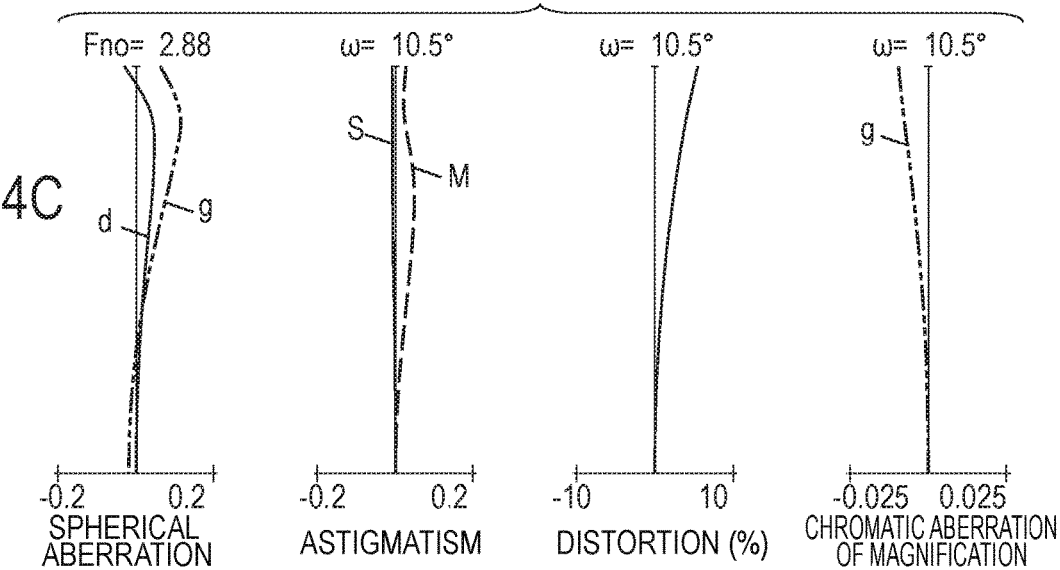
FIG. 4C is an aberration diagram of the zoom lens according to Embodiment 2 at a telephoto end.

FIG. 3 is a lens cross-sectional view of a zoom lens according to Embodiment 2 of the present invention at a wide angle end. FIG. 4A, FIG. 4B, and FIG. 4C are aberration diagrams of the zoom lens according to Embodiment 2 at the wide angle end, an intermediate zoom position, and a telephoto end, respectively.

Figure 5:
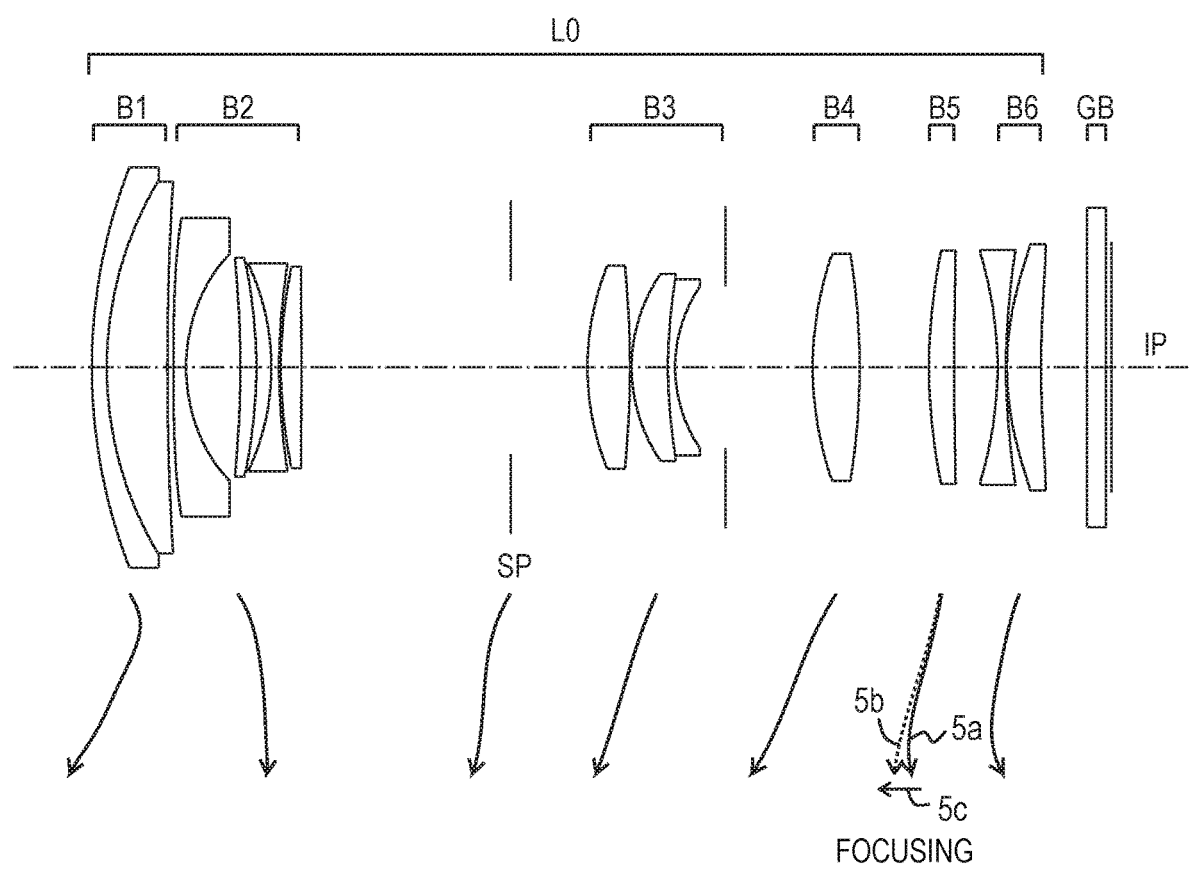
FIG. 5 is a lens cross-sectional view of a zoom lens according to Embodiment 3 of the present invention at a wide angle end.
Figure 6A:
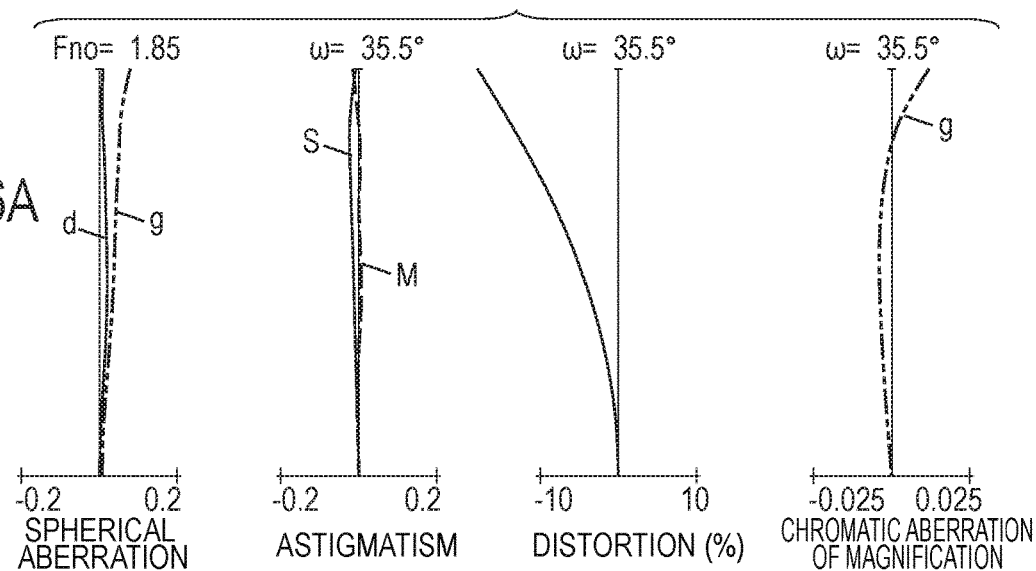
FIG. 6A is an aberration diagram of the zoom lens according to Embodiment 3 at the wide angle end.
Figure 6B:
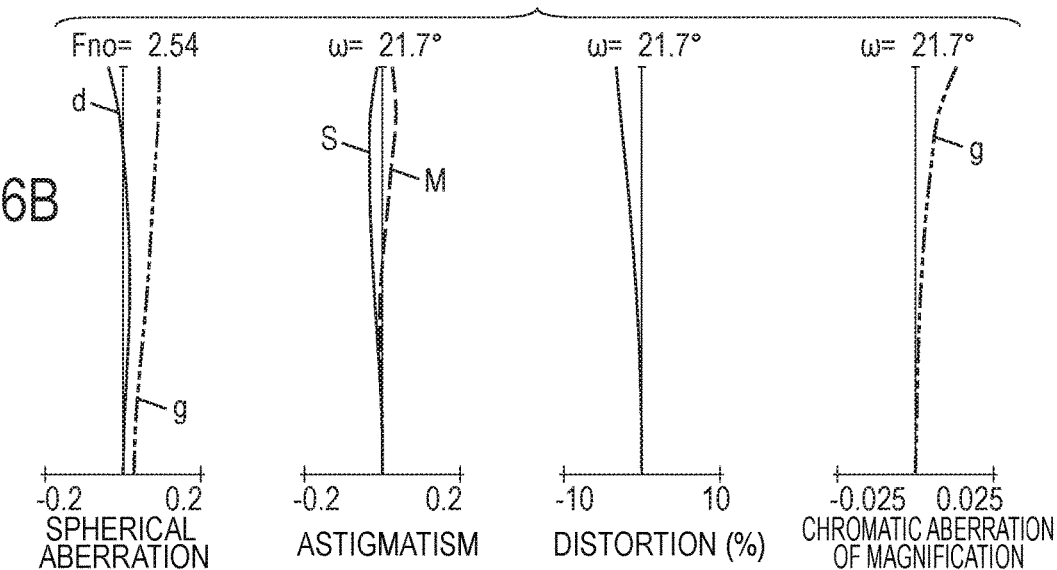
FIG. 6B is an aberration diagram of the zoom lens according to Embodiment 3 at an intermediate zoom position.
Figure 6C:
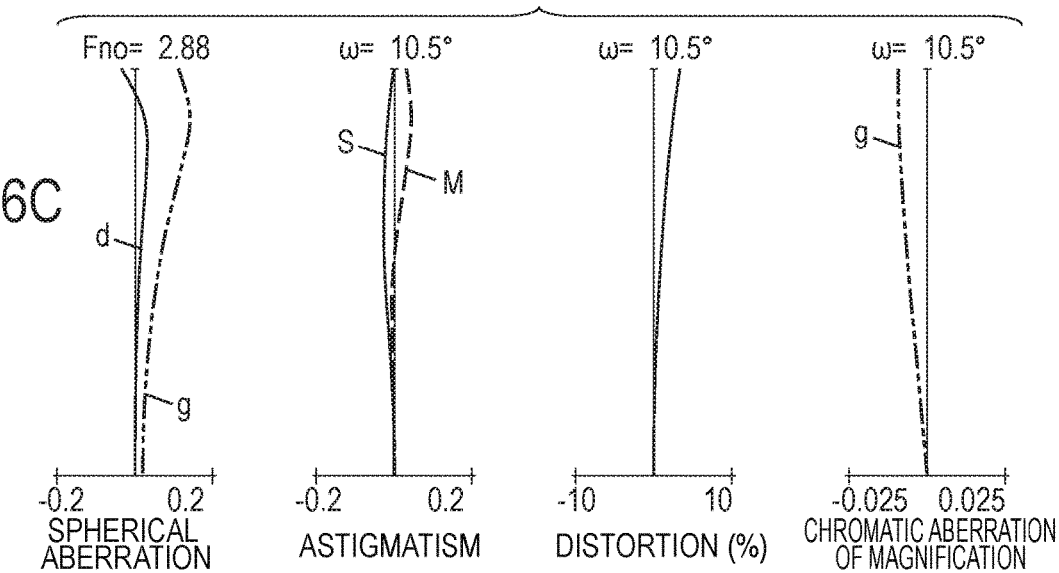
FIG. 6C is an aberration diagram of the zoom lens according to Embodiment 3 at a telephoto end.

FIG. 5 is a lens cross-sectional view of a zoom lens according to Embodiment 3 of the present invention at a wide angle end. FIG. 6A, FIG. 6B, and FIG. 6C are aberration diagrams of the zoom lens according to Embodiment 3 at the wide angle end, an intermediate zoom position, and a telephoto end, respectively.

Figure 7:
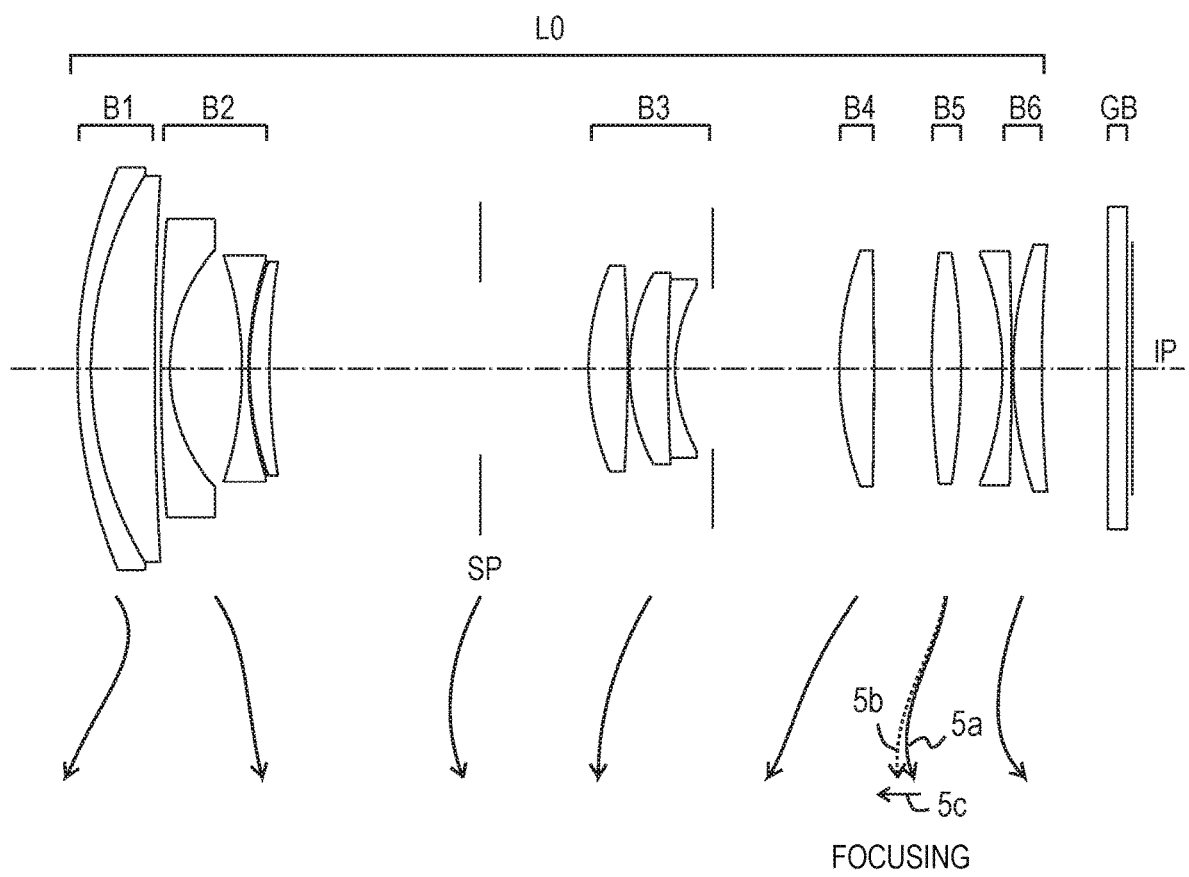
FIG. 7 is a lens cross-sectional view of a zoom lens according to Embodiment 4 of the present invention at a wide angle end.
Figure 8A:
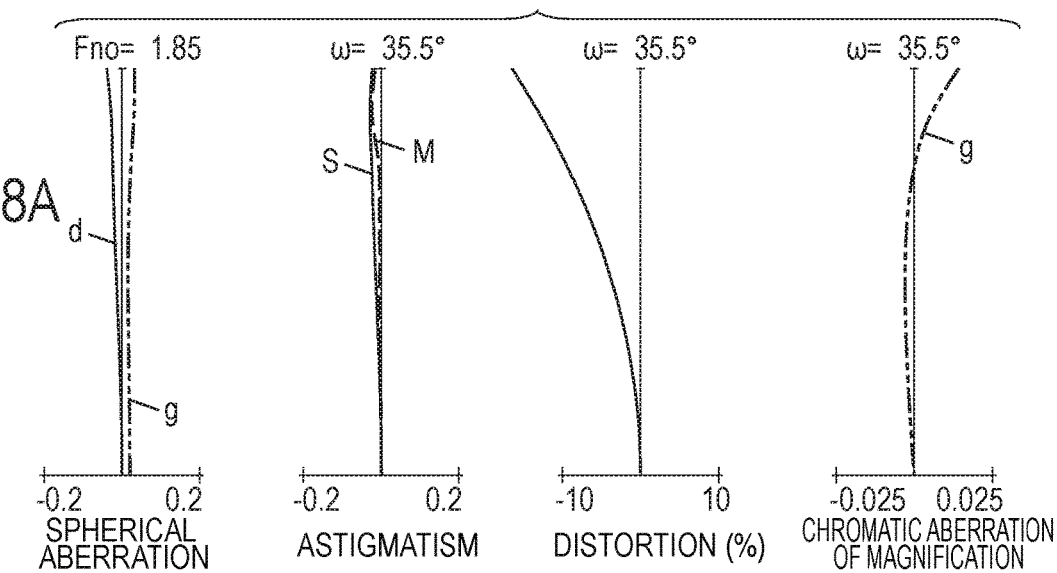
FIG. 8A is an aberration diagram of the zoom lens according to Embodiment 4 at the wide angle end.
Figure 8B:
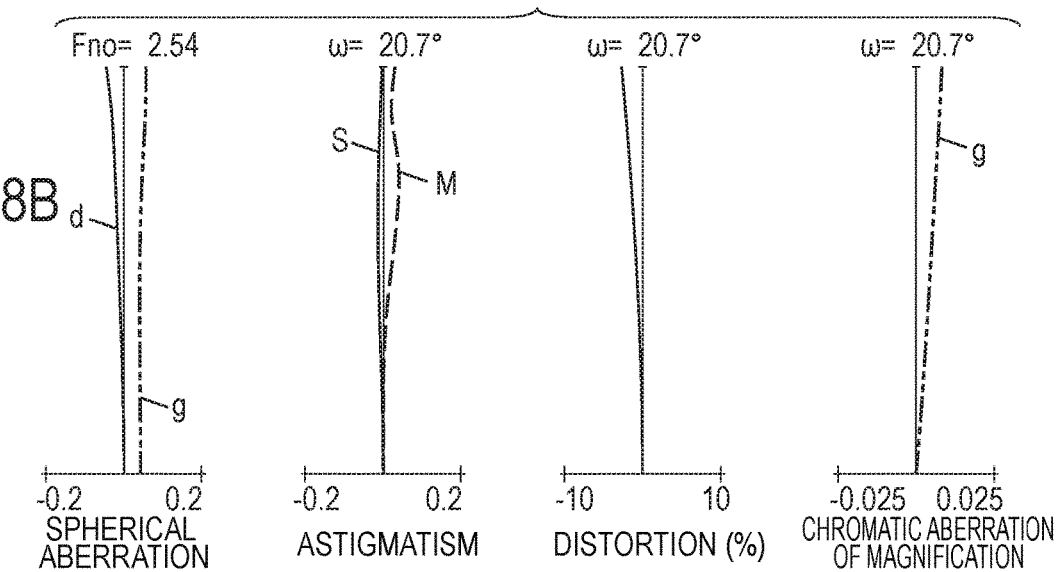
FIG. 8B is an aberration diagram of the zoom lens according to Embodiment 4 at an intermediate zoom position.
Figure 8C:
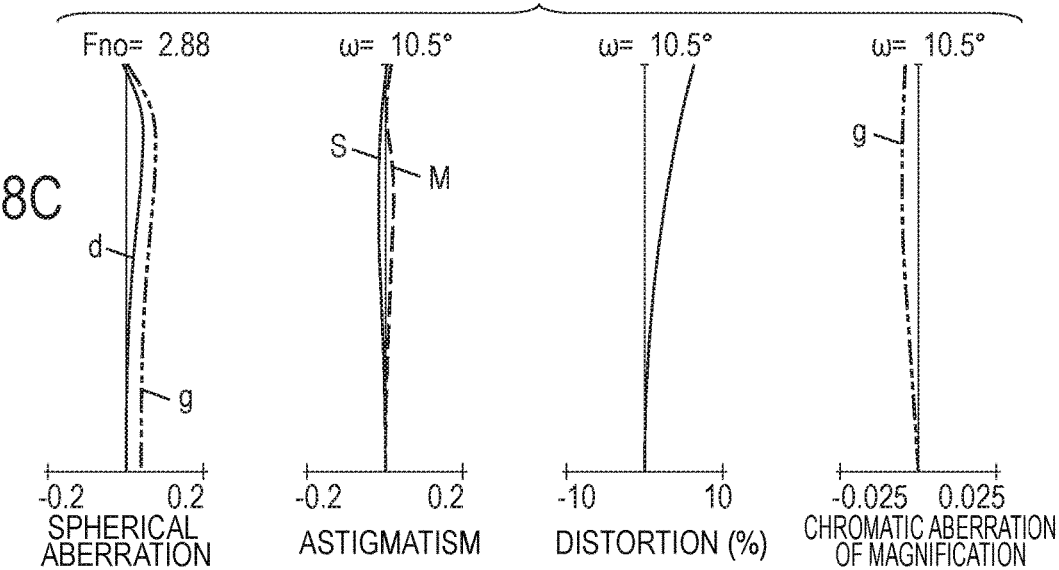
FIG. 8C is an aberration diagram of the zoom lens according to Embodiment 4 at a telephoto end.

FIG. 7 is a lens cross-sectional view of a zoom lens according to Embodiment 4 of the present invention at a wide angle end. FIG. 8A, FIG. 8B, and FIG. 8C are aberration diagrams of the zoom lens according to Embodiment 4 at the wide angle end, an intermediate zoom position, and a telephoto end, respectively.

Figure 9:
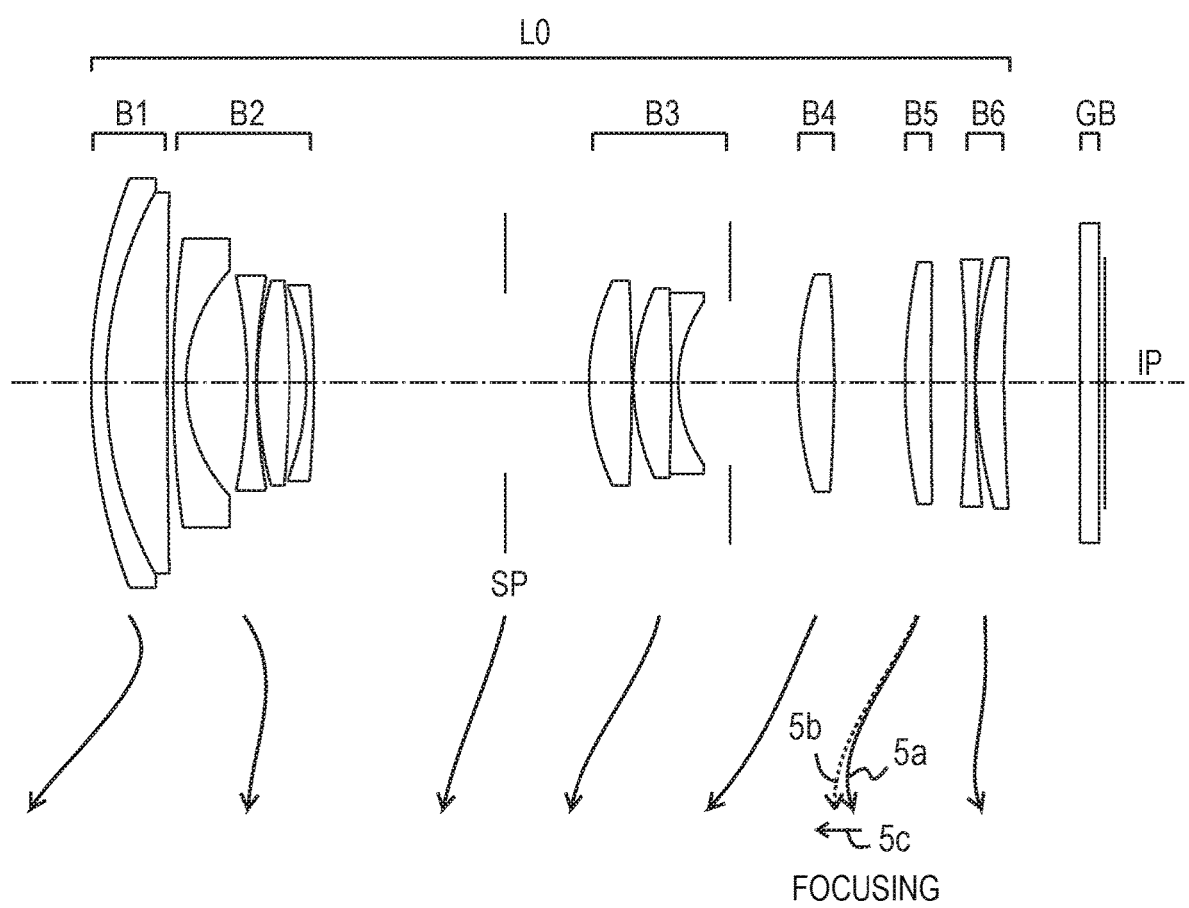
FIG. 9 is a lens cross-sectional view of a zoom lens according to Embodiment 5 of the present invention at a wide angle end.
Figure 10A:
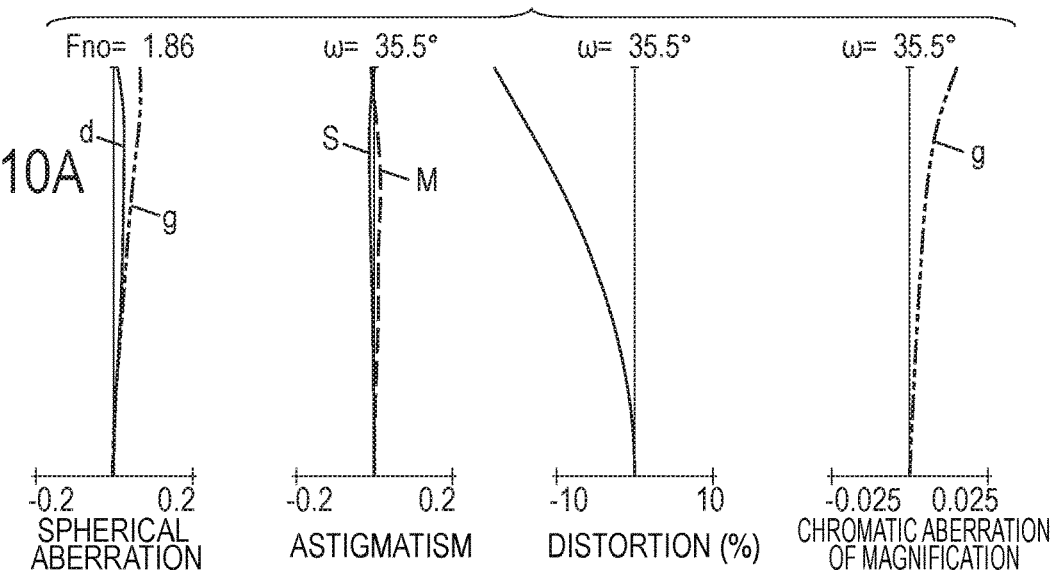
FIG. 10A is an aberration diagram of the zoom lens according to Embodiment 5 at the wide angle end.
Figure 10B:
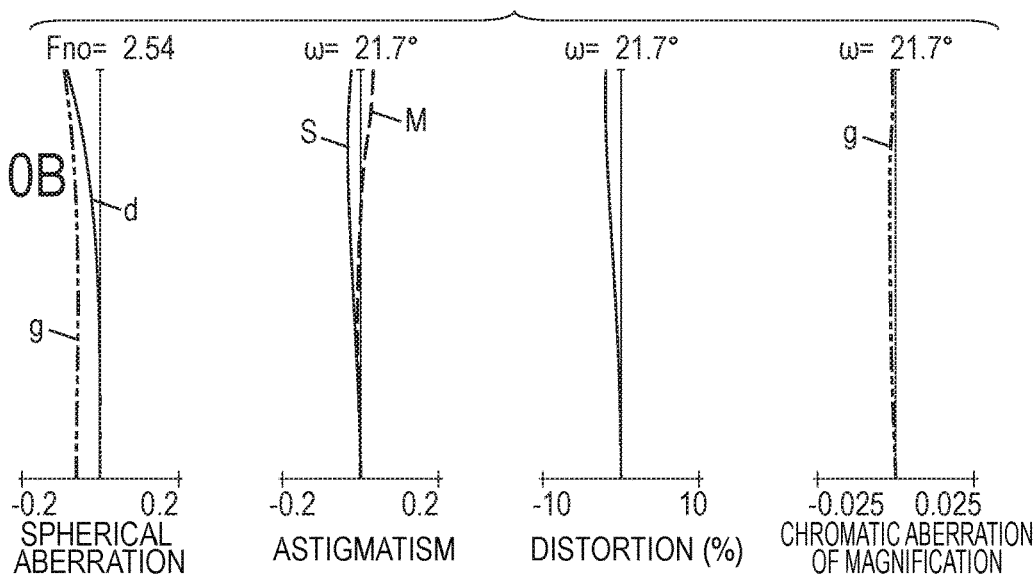
FIG. 10B is an aberration diagram of the zoom lens according to Embodiment 5 at an intermediate zoom position.
Figure 10C:
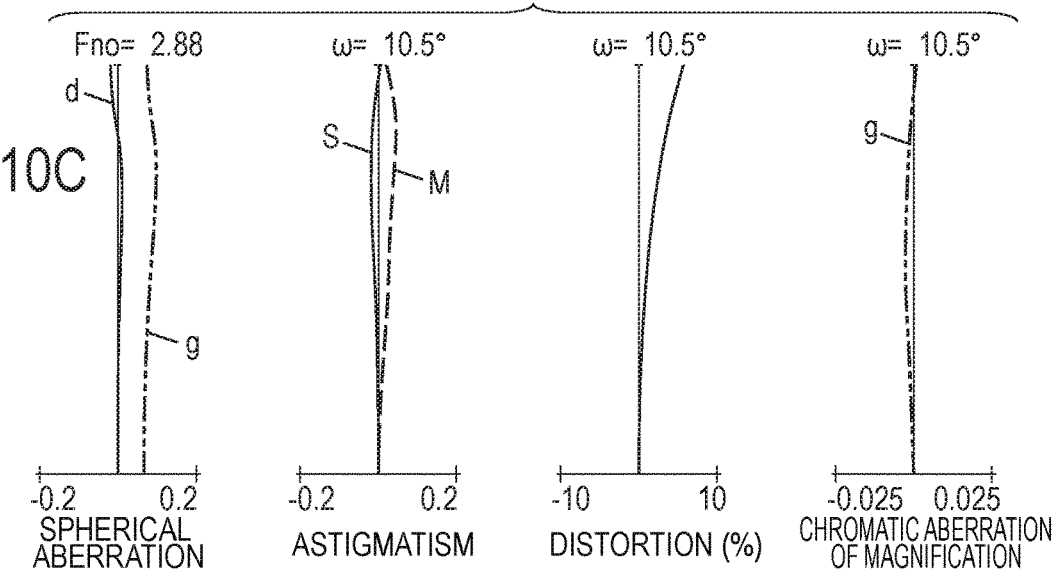
FIG. 10C is an aberration diagram of the zoom lens according to Embodiment 5 at a telephoto end.

FIG. 9 is a lens cross-sectional view of a zoom lens according to Embodiment 5 of the present invention at a wide angle end. FIG. 10A, FIG. 10B, and FIG. 10C are aberration diagrams of the zoom lens according to Embodiment 5 at the wide angle end, an intermediate zoom position, and a telephoto end, respectively.

Figure 11:
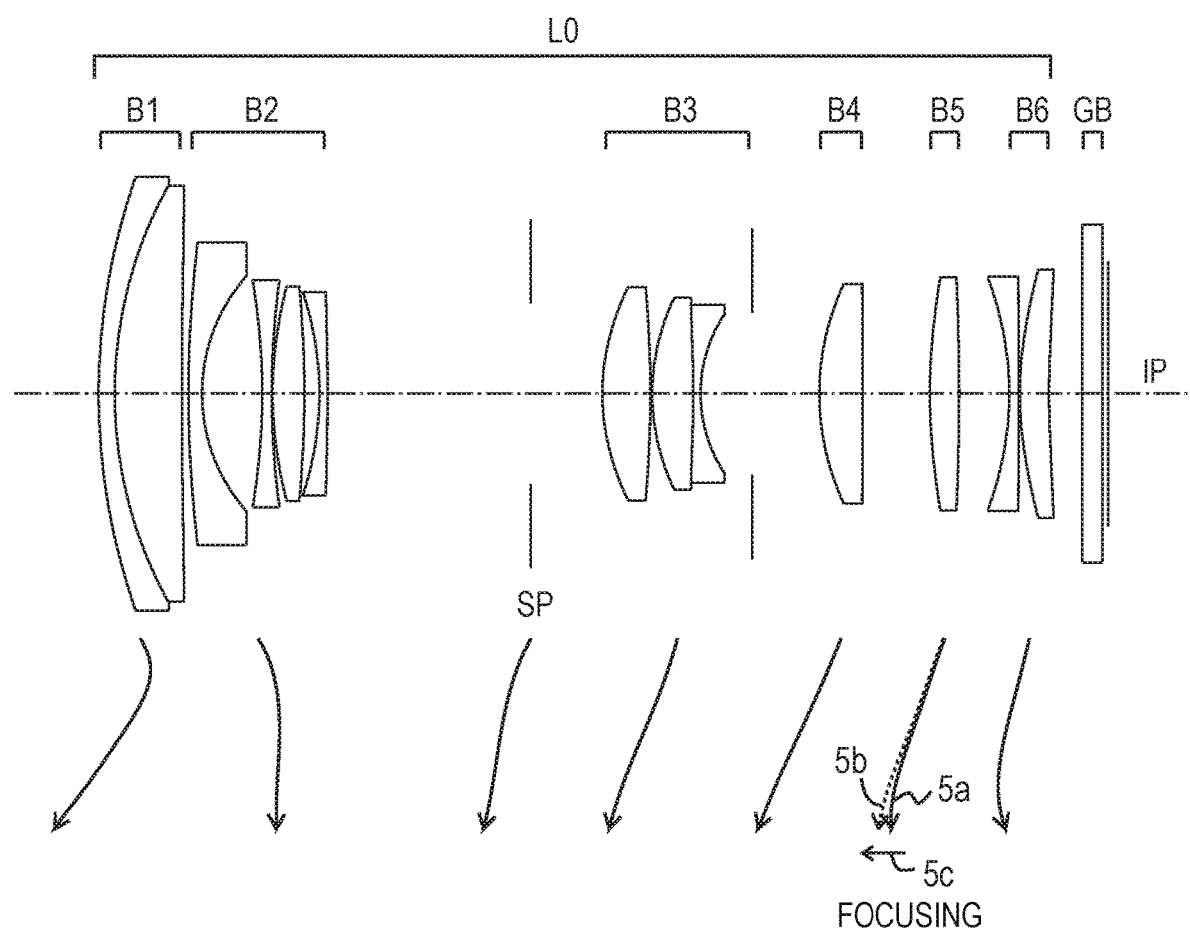
FIG. 11 is a lens cross-sectional view of a zoom lens according to Embodiment 6 of the present invention at a wide angle end.
Figure 12A:
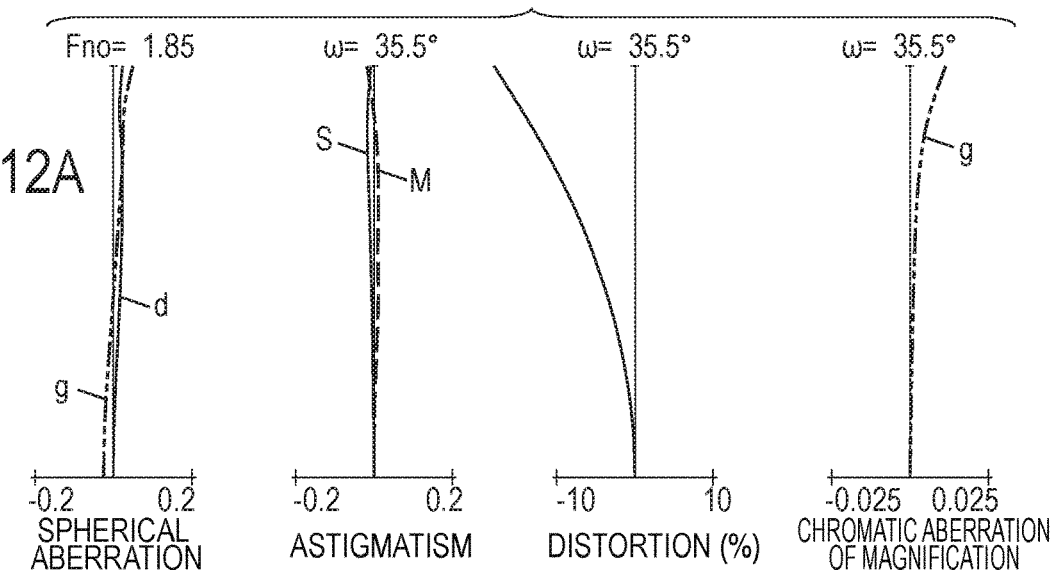
FIG. 12A is an aberration diagram of the zoom lens according to Embodiment 6 at the wide angle end.
Figure 12B:
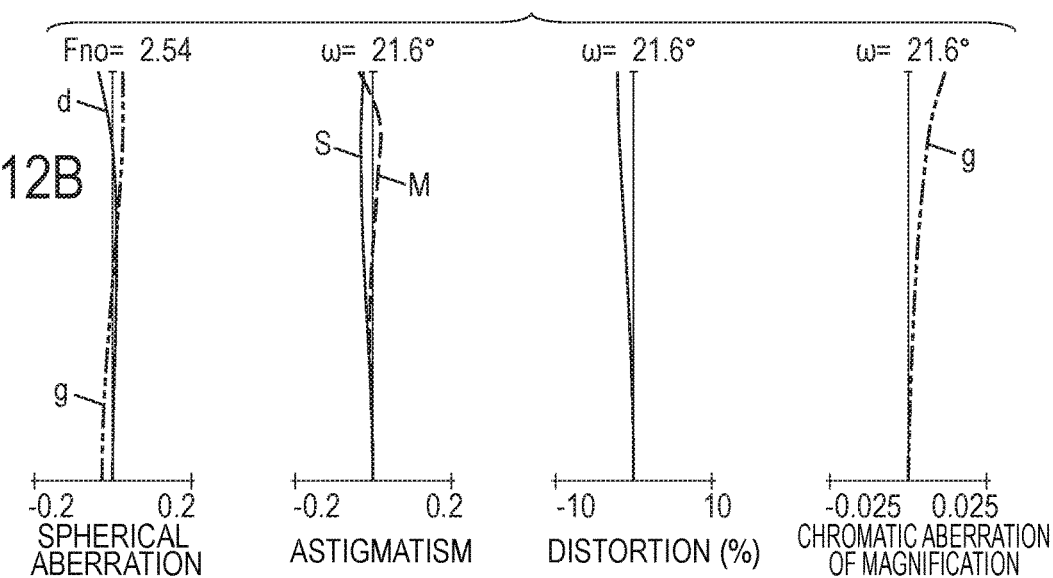
FIG. 12B is an aberration diagram of the zoom lens according to Embodiment 6 at an intermediate zoom position.
Figure 12C:
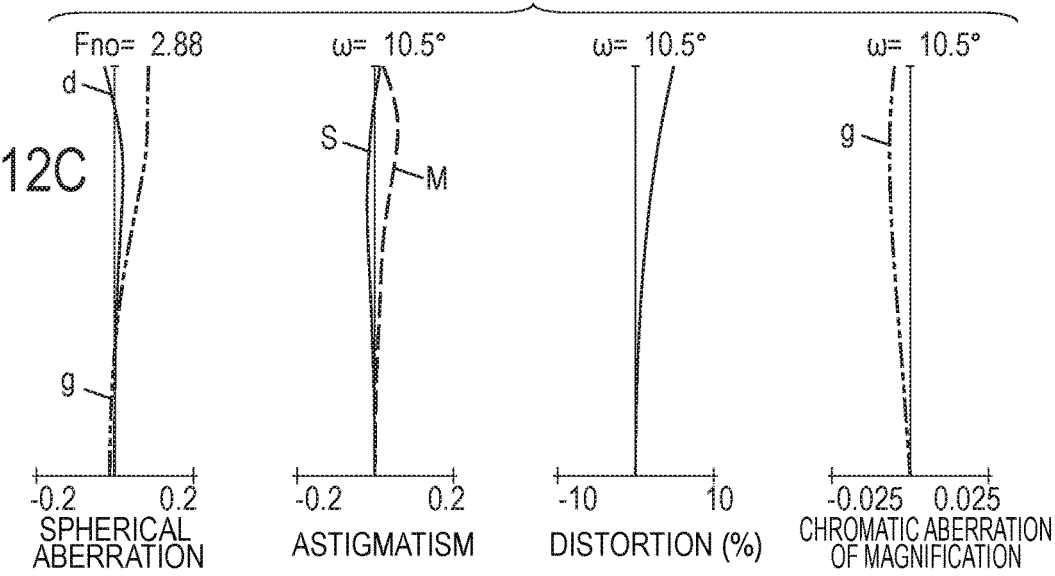
FIG. 12C is an aberration diagram of the zoom lens according to Embodiment 6 at a telephoto end.

FIG. 11 is a lens cross-sectional view of a zoom lens according to Embodiment 6 of the present invention at a wide angle end. FIG. 12A, FIG. 12B, and FIG. 12C are aberration diagrams of the zoom lens according to Embodiment 6 at the wide angle end, an intermediate zoom position, and a telephoto end, respectively.

The zoom lenses according to Embodiments 1 to 4 and 6 each have a zoom ratio of about 4.71 and an F-number of from about 1.85 to about 2.88. The zoom lens according to Embodiment 5 has a zoom ratio of about 4.71 and an F-number of from about 1.86 to about 2.88.

Figure 13:
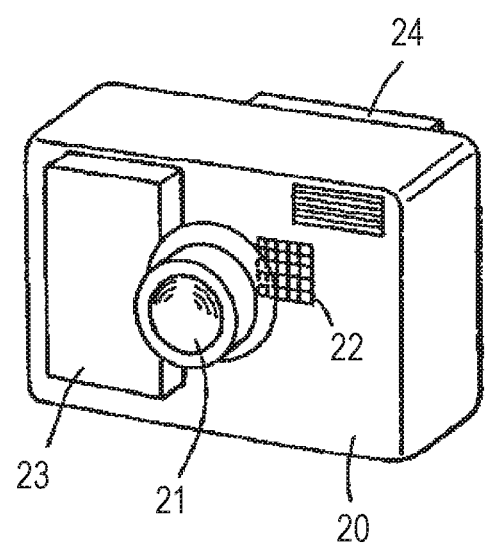
FIG. 13 is a schematic diagram of a main part of an image pickup apparatus according to one embodiment of the present invention.

FIG. 13 is a schematic diagram of a main part of a camera (image pickup apparatus) including the zoom lens according to any one of Embodiments of the present invention. The zoom lens according to each of Embodiments is an image pickup optical system used with a video camera, a digital camera, a monitoring camera, a TV camera, or other such image pickup apparatus. In the lens cross-sectional views, the left side is an object side (front side), and the right side is the image side (rear side). In the lens cross-sectional views, a zoom lens is denoted by L0. Moreover, the order of a lens unit from the object side is represented by "i", and the i-th lens unit is represented by Bi.

In the lens cross-sectional view of each of Embodiments, a first lens unit having a positive refractive power is denoted by B1, a second lens unit having a negative refractive power is denoted by B2, a third lens unit having a positive refractive power is denoted by B3, a fourth lens unit having a positive refractive power is denoted by B4, and a fifth lens unit having a positive refractive power is denoted by B5. In Embodiments 1 to 5, a sixth lens unit having a negative refractive power is denoted by B6, and in Embodiment 6, a sixth lens unit having a positive refractive power is denoted by B6.

In each of Embodiments, an aperture stop SP is arranged between the second lens unit B2 and the third lens unit B3. With this arrangement, flare at an intermediate image height at the wide angle end can be blocked, and high performance is easily achieved. Moreover, when the aperture stop SP is separated away from an image pickup element, an angle of incidence of a ray on the image pickup element can be reduced, and hence degradation of an image due to shading and other causes is reduced to easily achieve high image quality.

Further, when the aperture stop SP is arranged between the second lens unit B2 and the third lens unit B3, the lens units and the aperture stop SP can be moved separately (along different loci) for zooming.

In each of Embodiments, the aperture stop is configured to move separately for zooming as described above, to thereby block flare at a low image height at the intermediate zoom position and achieve high image quality. It should be noted, however, that when a mechanical mechanism is complicated with the separate movement of the aperture stop, the third lens unit B3 and the aperture stop SP may be moved integrally (along the same locus) to simplify the configuration.

An optical block GB corresponds, for example, to an optical filter, a face plate, a crystal low pass filter, or an infrared cut filter. As an image plane IP, an image pickup surface of an image pickup element (photoelectric conversion element) such as a CCD sensor or a CMOS sensor is arranged when the zoom lens is used as a photographing optical system of a video camera or a digital still camera.

In the aberration diagrams, a solid line "d" indicates a d-line (wavelength: 587.6 nm), and a two-dot chain line "g" indicates a g-line (wavelength: 435.8 nm). In astigmatism diagrams, a broken line M indicates a meridional image plane of the d-line, and a solid line S indicates a sagittal image plane of the d-line. Chromatic aberration of magnification is indicated by the g-line. A half angle of view (value that is half an image pickup field angle) is represented by "ω", and an F-number of the zoom lens is represented by "fno". In each of Embodiments below, the wide angle end and a telephoto end refer to zoom positions when a magnification-varying lens unit is located in a range of being mechanically movable on an optical axis in a normal photography region.

In each of Embodiments, a change in interval between each pair of lens units for zooming from the wide angle end to the telephoto end is as follows. At the telephoto end as compared to the wide angle end, an interval between the first lens unit B1 and the second lens unit B2 is increased, an interval between the second lens unit B2 and the aperture stop SP is reduced, and an interval between the aperture stop SP and the third lens unit B3 is reduced.

Further, an interval between the third lens unit B3 and the fourth lens unit B4 is reduced, an interval between the fourth lens unit B4 and the fifth lens unit B5 is increased, and an interval between the fifth lens unit B5 and the sixth lens unit B6 is increased. The first lens unit B1 is configured to move toward the object side for zooming from the wide angle end to the telephoto end, to thereby weaken the positive refractive power of the first lens unit B1 and satisfactorily correct axial chromatic aberration and comatic aberration at the telephoto end.

In each of Embodiments, the first lens unit B1, the third lens unit B3, the fourth lens unit B4, and the fifth lens unit B5 are configured to move toward the object side as indicated by the arrows for zooming from the wide angle end to the telephoto end. The second lens unit B2 is configured to move toward the image side. With the second lens unit B2 being moved toward the image side, a magnification-varying action of the second lens unit B2 is increased to easily achieve a high zoom ratio.

Meanwhile, when the second lens unit B2 is moved toward the image side, a distance between the first lens unit B1 and the second lens unit B2 is increased. The aperture stop SP is arranged on the image side of the second lens unit B2, and hence when the interval between the first lens unit B1 and the second lens unit B2 becomes much larger, an effective diameter of a front lens is increased.

Therefore, the second lens unit B2 may be moved toward the object side instead of being moved toward the image side to suppress the increase in effective diameter of the front lens. At this time, the magnification-varying action of the second lens unit B2 is reduced, and hence the movement may be determined depending on how to balance the zoom ratio and the effective diameter of the front lens. Moreover, the sixth lens unit B6 is configured to move toward the image side at the telephoto end as compared to the wide angle end in Embodiment 4, and to move toward the object side at the telephoto end as compared to the wide angle end in other Embodiments.

When the sixth lens unit B6 is moved toward the image side, a peripheral ray passes a high position of the sixth lens unit B6, and hence curvature of field and chromatic aberration of magnification are easily corrected. Moreover, when the refractive power of the sixth lens unit B6 is positive, a magnification-varying action is increased with the movement toward the image side, and hence the positive refractive powers of the second lens unit B2 and the third lens unit B3, which have main magnification-varying actions, can be reduced. Therefore, a manufacturing sensitivity can be reduced, or the number of constituent lenses can be reduced.

Meanwhile, when the sixth lens unit B6 is moved toward the image side, it is required to secure a lens diameter, and hence a thickness of the lens tends to be increased. In Embodiments 1 to 3, 5, and 6, the sixth lens unit B6 is moved toward the object side such that the peripheral ray passes a low position of the sixth lens unit B6, to thereby reduce the lens diameter, and hence the thickness of the lens. As to the sixth lens unit B6 also, the movement may be determined depending on how to balance the zoom ratio and the size of the sixth lens unit B6.

In each of Embodiments, the fifth lens unit B5 is configured to move to the object side for focusing from infinity to proximity.

In each of Embodiments, the fifth lens unit B5 is moved to correct an image plane variation accompanying magnification varying, and perform focusing. A solid-line curve $5a$ and a dotted-line curve $5b$ regarding the fifth lens unit B5 are movement loci for correcting the image plane variation accompanying magnification varying when the zoom lens L0 is focused on an object at infinity and an object at close distance, respectively. Moreover, focusing from the object at infinity to the object at close distance is performed by moving the fifth lens unit B5 toward the object side as indicated by an arrow $5c$.

In each of Embodiments, the third lens unit B3 is configured to move in a direction having a component in a direction perpendicular to the optical axis during image blur correction to displace an image in the direction perpendicular to the optical axis. In this manner, image blur that occurs when the zoom lens is shaken is corrected. In each of Embodiments, image blur correction is performed without newly adding a variable apex angle prism or other such optical members or a lens unit for image stabilization, to thereby prevent an increase in size of the zoom lens.

In each of Embodiments, the lens unit is moved in the direction having the component in the direction perpendicular to the optical axis to perform image blur correction, and as to the movement method, the image blur can be corrected when the lens unit is moved so as to have the component in the direction perpendicular to the optical axis. For example, when it is allowed to complicate the lens barrel structure, image blur correction may be performed by rotating the lens unit so as to have a rotation center on the optical axis. Moreover, as the lens unit, instead of the above-mentioned lens unit, the first lens unit B1, the second lens unit B2, or other such lens unit, a plurality of lens units, or the entire optical system may be moved.

In each of Embodiments, the first lens unit B1 consists of one negative lens and one positive lens. With the first lens unit B1, which has the largest effective diameter in the optical system, consisting of two lenses, the thickness of the first lens unit B1 may be suppressed, and a reduced thickness of the camera in a retracted state is achieved. Moreover, with the use of two lenses, spherical aberration and comatic aberration are satisfactorily corrected at the telephoto end.

The second lens unit consists of a total of three or four lenses including two or three negative lenses and one or two positive lenses. When the second lens unit B2 consists of, in order from the object side, a negative lens, a negative lens, a positive lens, and a negative lens, the negative refractive power can be shared by the three negative lenses, and hence a sensitivity of the second lens unit B2 can be suppressed to be low. Moreover, when a negative lens is arranged closest to the image side, spherical aberration and axial chromatic aberration can be satisfactorily corrected together with the third lens unit B3 at the telephoto end.

Moreover, when the second lens unit B2 consists of, in order from the object side, a negative lens, a positive lens, a negative lens, and a positive lens, curvature of field can be satisfactorily corrected at the wide angle end with an action of the intermediate positive lens. In addition, achromatization in the second lens unit B2 is easily performed, and chromatic aberration of magnification is easily corrected at the wide angle end.

Moreover, when the second lens unit B2 consists of, in order from the object side, a negative lens, a negative lens, and a positive lens, the thickness of the camera in the retracted state can be reduced with the small number of lenses, which is advantageous in downsizing the zoom lens. The second lens unit B2 consists of single lenses, and an air lens between the lenses is used to satisfactorily correct curvature of field at the wide angle end. Moreover, when an aspherical surface is used on a negative lens of the second lens unit B2, curvature of field and distortion can be satisfactorily corrected, and further increase in performance is easily achieved.

In each of Embodiments, the third lens unit B3 consists of two positive lenses and one negative lens. The third lens unit B3 is a lens unit with a large magnification-varying action, and hence, through adoption of a configuration in which a positive lens leads, a configuration in which a principal point is located on the object side is achieved. Moreover, when the negative lens is concave on the image side, comatic aberration over the entire zoom range is satisfactorily corrected.

In each of Embodiments, the fourth lens unit B4 consists of one positive lens. This positive lens is particularly formed of a low dispersion material to satisfactorily correct chromatic aberration of magnification at the wide angle end and axial chromatic aberration at the telephoto end. With the fourth lens unit B4 consisting of the minimum number of lenses, the reduction in thickness and the increase in performance of the camera are achieved at the same time. Moreover, the fifth lens unit consists of one lens component, that is, one lens or a lens component obtained by cementing a plurality of lenses.

In each of Embodiments, the one lens component consists of one positive lens. The fifth lens unit B5 is a focus lens, and hence when consisting of the minimum number of lenses, the fifth lens unit B5 is reduced in weight to facilitate high-speed focusing. An aspherical surface may be used for the fifth lens unit B5, and curvature of field can be satisfactorily corrected at the entire zoom range with the aspherical surface.

When the fifth lens unit B5 consists of a cemented lens obtained by cementing a plurality of lenses, aberrations are easily corrected. Moreover, the sixth lens unit consists of one negative lens and one positive lens. An air lens having a positive refractive power is formed between the two lenses to adjust a Petzval sum of the zoom lens and satisfactorily correct curvature of field over the entire zoom range. An aspherical surface may be used in the sixth lens unit B6, and curvature of field is easily corrected with the aspherical surface.

In many zoom lenses used with image pickup apparatus that place importance on downsizing and the reduced thickness, large distortion is generated at the wide angle end, and is electronically corrected to achieve downsizing and increased performance of the zoom lens.

In general, when large distortion is generated, large spherical aberration is generated due to a variation in object distance. Therefore, even when the optical performance is satisfactory at infinity, large spherical aberration is generated to reduce the optical performance at close proximity. In particular, in a zoom lens having a small and bright F-number (Fno) at the wide angle end, large spherical aberration is generated for focusing.

In the zoom lens according to each of Embodiments, in order to suppress the generation of spherical aberration at such time, the fifth lens unit B5 for focusing is arranged in the vicinity of an image plane at the wide angle end to increase an extension amount. In order to increase the extension amount, the fifth lens unit B5 is reduced in positive refractive power, and is further arranged at a position at which a pupil paraxial ray is low in the vicinity of the image plane, to thereby suppress the variation in spherical aberration to be small.

Meanwhile, a focus change amount is increased at the telephoto end, and hence there is adopted a configuration in which the fifth lens unit B5 having a weak positive refractive power is arranged on the object side to obtain a desired focus sensitivity. With the above-mentioned configuration, a zoom lens having satisfactory focus performance over the entire zoom range is achieved.

In Embodiments 1 to 6, the zoom lens L0 consists of, in order from the object side to the image side, the first to fifth lens units B1 to B5 having the positive, negative, positive, positive, and positive refractive powers, respectively, and the sixth lens unit B6 having the positive or negative refractive power.

For zooming from the wide angle end to the telephoto end, the first lens unit B1 is configured to move toward the object side. An interval between each pair of adjacent lens units is changed for zooming. The fifth lens unit B5 is configured to move for focusing. A focal length of the zoom lens at the wide angle end is represented by "fw", and a focal length of the fifth lens unit B5 is represented by f5. An F-number of the zoom lens at the wide angle end is represented by Fnow, a total length of the zoom lens at the wide angle end is represented by Lw, and a distance from a lens surface on the object side of the fifth lens unit B5 to the image plane at the wide angle end when the zoom lens L0 is focused at infinity is represented by D5iw. A movement amount of the fifth lens unit for zooming from the wide angle end to the telephoto end when the zoom lens L0 is focused at infinity is represented by M5.

At this time, the following conditional expressions are satisfied:

$$2.0 < f5/fw < 10.0 \quad (1),$$

$$01 < Fnow*D5iw/Lw < 0.8 \quad (2); \text{ and}$$

$$0.05 M5/Lw < 0.30 \quad (3).$$

The "movement amount of a lens unit" as used herein refers to a difference between a position on the optical axis at the wide angle end and a position on the optical axis at the telephoto end. A sign of the movement amount is negative when the lens unit is located on the object side, and is positive when the lens unit is located on the image side at the telephoto end as compared to the wide angle end.

Next, technical meanings of the above-mentioned conditional expressions are described. The conditional expression (1) defines a ratio of the focal length of the fifth lens unit B5 to the focal length of the zoom lens at the wide angle end. When the ratio falls below the lower limit of the conditional expression (1), the positive refractive power of the fifth lens unit B5 becomes much stronger, and hence it becomes difficult to satisfactorily correct spherical aberration at close proximity at the wide angle end.

When the ratio exceeds the upper limit of the conditional expression (1), the positive refractive power of the fifth lens unit B5 becomes weaker, and a focus sensitivity becomes much lower. When the focus sensitivity becomes much lower, the extension amount of the fifth lens unit B5 configured to correct the focus is increased, with the result that it becomes difficult to secure a long focus movement amount, or to reduce the object distance during proximity photography.

The conditional expression (2) defines a position in an optical axis direction of the fifth lens unit B5 at the wide angle end. In the zoom lens according to each of Embodiments, exertion of the effect of correcting spherical aberration becomes easier as the F-number (Fno) becomes smaller, and hence the fifth lens unit B5 for focusing is arranged in the vicinity of the image plane. When the value falls below the lower limit of the conditional expression (2), the fifth lens unit B5 is arranged near the image plane, and the focus sensitivity becomes much lower. Therefore, it becomes difficult to secure a focus movement amount, or to reduce the object distance during proximity photography. Or the F-number becomes much smaller, and large spherical aberration tends to be generated, and hence it becomes difficult to correct the aberration.

When the value exceeds the upper limit of the conditional expression (2), the fifth lens unit B5 is arranged at a position away from the image plane. Therefore, an entrance height of the pupil paraxial ray becomes higher, and a variation in spherical aberration due to focusing is increased, and hence it becomes difficult to correct the aberration. Or the F-number is disadvantageously increased.

The conditional expression (3) relates to a ratio of the movement amount of the fifth lens unit B5 for zooming to the total length of the zoom lens at the wide angle end. When the ratio falls below the lower limit of the conditional expression (3), the movement amount of the fifth lens unit B5 becomes much smaller, and the focus sensitivity becomes much lower at the telephoto end. A variation in focus is large at the telephoto end, and hence when the focus sensitivity becomes much lower, it becomes difficult to secure a sufficient length of the focus movement amount, or to reduce the object distance during proximity photography. Moreover, large flare occurs at the lower line to form a coma-like spot in the periphery, and hence optical performance is reduced.

When the ratio exceeds the upper limit of the conditional expression (3), the movement amount of the fifth lens unit B5 becomes much larger, and the fifth lens unit B5 is separated away from the image plane, and hence the focus sensitivity becomes much higher. Therefore, mechanical control becomes difficult, and at the same time, the zoom lens is focused on a region in which an axial ray and a peripheral ray overlap to generate large curvature of field.

In order to reduce the size and spherical aberration during proximity photography, it is more preferred to set the numerical value ranges of the conditional expressions (1) to (3) as follows:

$$3.0 < f5/fw < 8.0 \quad (1a);$$

$$0.2 < Fnow*D5iw/Lw < 0.5 \quad (2a); \text{ and}$$

$$0.05 < M5/Lw < 0.25 \quad (3a).$$

It is more preferred to set the numerical ranges of the conditional expressions (1a) to (3a) as follows:

$$4.0 < f5/fw < 6.0 \quad (1b);$$

$$0.3 < Fnow*D5iw/Lw < 0.4 \quad (2b); \text{ and}$$

$$0.08 < M5/Lw < 0.20 \quad (3b).$$

In each of Embodiments, it is preferred to satisfy one or more of the following conditional expressions. A lateral magnification of the fifth lens unit B5 at the wide angle end when the zoom lens L0 is focused at infinity is represented by β5w, and a lateral magnification of the sixth lens unit B6 at the wide angle end when the zoom lens L0 is focused at infinity is represented by β6w. A focus sensitivity ESW of the fifth lens unit at the wide angle end when the zoom lens L0 is focused at infinity is expressed as:

$$ESW=(1-\beta 5w^2) \times \beta 6w^2.$$

A lateral magnification of the fifth lens unit B5 at the telephoto end when the zoom lens L0 is focused at infinity is represented by β5t, and a lateral magnification of the sixth lens unit B6 at the telephoto end when the zoom lens L0 is focused at infinity is represented by β6t. A focus sensitivity EST of the fifth lens unit at the telephoto end when the zoom lens L0 is focused at infinity is expressed as:

$$EST=(1-\beta 5t^2) \times \beta 6t^2.$$

A lateral magnification of the fifth lens unit B5 at the wide angle end when the zoom lens L0 is focused at infinity is represented by β5w, and a lateral magnification of the fifth lens unit B5 at the telephoto end when the zoom lens L0 is focused at infinity is represented by β5t. A curvature radius of a lens surface closest to the object side and a curvature radius of a lens surface closest to the image side in the fifth lens unit B5 are represented by R5a and R5b, respectively.

A focal length of the sixth lens unit B6 is represented by f6. A movement amount of the sixth lens unit B6 for zooming from the wide angle end to the telephoto end when the zoom lens L0 is focused at infinity is represented by M6. A combined focal length of the fourth lens unit B4, the fifth lens unit B5, and the sixth lens unit B6 at the wide angle end when the zoom lens L0 is focused at infinity is represented by f456w.

At this time, it is preferred to satisfy one or more of the following conditional expressions:

$$0.3 < ESW < 0.7 \quad (4);$$

$$0.6 < EST < 1.2 \quad (5);$$

$$1.5 < EST/ESW < 5.0 \quad (6);$$

$$0.5 < \beta 5t/\beta 5w < 1.0 \quad (7);$$

$$-1.5 < (R5a+R5b)/(R5a-R5b) < 0.5 \quad (8);$$

$$|f5/f6| < 1.0 \quad (9);$$

$$-0.1 < M6/M5 < 0.6 \quad (10); \text{ and}$$

$$1.5 < f456w/fw < 3.5 \quad (11).$$

Next, technical meanings of the above-mentioned conditional expressions are described. The conditional expression (4) relates to the focus sensitivity of the fifth lens unit B5 at the wide angle end. When the value falls below the lower limit of the conditional expression (4), the extension amount of the fifth lens unit B5 for correcting the focus becomes larger, with the result that it becomes difficult to secure a sufficient length of the focus movement amount, or to reduce the object distance during proximity photography. When the value exceeds the upper limit of the conditional expression (4), mechanical control becomes difficult. Or the positive refractive power of the fifth lens unit B5 becomes stronger, or it is required to arrange the fifth lens unit B5 at a position at which the pupil paraxial ray is high, with the result that it becomes difficult to correct spherical aberration during proximity photography.

The conditional expression (5) relates to the focus sensitivity of the fifth lens unit B5 at the telephoto end. When the ratio falls below the lower limit of the conditional expression (5), the extension amount of the fifth lens unit B5 for correcting the focus becomes larger, with the result that it becomes difficult to secure a sufficient length of the focus movement amount, or to reduce the object distance during proximity photography. Particularly at the telephoto end, a variation amount of the focus is large even with the same change in photographing distance, and hence it is required to set the focus sensitivity to be higher than that at the wide angle end.

When the value exceeds the upper limit of the conditional expression (5), mechanical control becomes difficult, and at the same time, the fifth lens unit B5 is separated away from the image plane, with the result that the zoom lens is focused on a region in which the axial ray and the peripheral ray overlap to generate large curvature of field.

The conditional expression (6) defines a ratio between the focus sensitivities of the fifth lens unit B5 at the wide angle end and the telephoto end. As described above, the variation amount of the focus becomes larger at the telephoto end than at the wide angle end even with the same change in photographing distance. Therefore, the focus sensitivities as in the conditional expression (6) are set to balance the extension amounts of the fifth lens unit B5 at the wide angle end and the telephoto end, to thereby achieve the high performance during the proximity photographing distance and downsizing of the zoom lens.

When the ratio falls below the lower limit of the conditional expression (6), the focus sensitivity at the telephoto end becomes much lower, and it becomes difficult to secure a sufficient length of the focus movement amount, or to reduce the object distance during proximity photography. Or the focus sensitivity at the wide angle end becomes much higher, and mechanical control becomes difficult, or it becomes difficult to correct spherical aberration at the proximity photographing distance.

When the ratio exceeds the upper limit of the conditional expression (6), the focus sensitivity at the telephoto end becomes much higher, and mechanical control becomes difficult. At the same time, it becomes difficult to correct curvature of field at the proximity photographing distance. Or the focus sensitivity at the wide angle end becomes much lower, and it becomes difficult to secure a sufficient length of the focus movement amount, or to reduce the object distance during proximity photography.

The conditional expression (7) defines a sharing amount of magnification varying of the fifth lens unit B5. When the ratio falls below the lower limit of the conditional expression (7), the movement amount of the fifth lens unit B5 toward the object side becomes larger, or the refractive power of the fifth lens unit B5 becomes stronger. When the movement amount of the fifth lens unit B5 toward the object side becomes larger, the fifth lens unit B5 is separated away from the image plane, and the focus sensitivity becomes much higher. Therefore, mechanical control becomes difficult, and at the same time, it becomes difficult to correct curvature of field at the proximity photographing distance at the telephoto end. Or the positive refractive power of the fifth lens unit B5 becomes stronger, and it becomes difficult to correct spherical aberration at the proximity photographing distance at the wide angle end.

When the ratio exceeds the upper limit of the conditional expression (7), the movement amount of the fifth lens unit B5 toward the object side becomes smaller for zooming, or the positive refractive power of the fifth lens unit B5 becomes weaker. When the movement amount of the fifth lens unit B5 toward the object side becomes smaller, the focus sensitivity becomes lower at the telephoto end, and it becomes difficult to secure a sufficient length of the focus movement amount, or to reduce the object distance during proximity photography. Or when the positive refractive power of the fifth lens unit B5 becomes weaker, the focus sensitivity at the wide angle end becomes much lower, and it becomes difficult to secure a sufficient length of the focus movement amount, or to reduce the object distance during proximity photography.

The conditional expression (8) defines a shape factor (lens shape) based on the lens surface on the object side and the lens surface on the image side of the fifth lens unit B5. With the lens shape being in the range of the conditional expression (8), variations in spherical aberration and curvature of field are satisfactorily corrected for focusing. When the value falls below the lower limit of the conditional expression (8), curvature of field significantly falls toward an undercorrection side at the wide angle end and the telephoto end, and hence optical performance at the periphery is reduced. When the value exceeds the upper limit of the conditional expression (8), spherical aberration falls toward the undercorrection side at the wide angle end, and hence optical performance at an image plane center is reduced.

The conditional expression (9) defines a ratio between the focal lengths of the fifth lens unit B5 and the sixth lens unit B6. The sixth lens unit B6 is a lens unit configured to adjust the Petzval sum of the zoom lens, and hence corrects curvature of field. Therefore, an absolute value of the negative refractive power of the entire lens unit is weaker (smaller) than an absolute value of the positive refractive power of the fifth lens unit B5 to correct aberrations. When the absolute value of the negative refractive power of the sixth lens unit B6 becomes much stronger (larger) than the absolute value of the positive refractive power of the fifth lens unit B5 to exceed the upper limit of the conditional expression (9), curvature of field is disadvantageously overcorrected.

The conditional expression (10) defines a ratio between the movement amounts of the fifth lens unit B5 and the sixth lens unit B6 for zooming from the wide angle end to the telephoto end. When the ratio falls below the lower limit of the conditional expression (10), the movement amount of the sixth lens unit B6 toward the image side becomes larger, with the result that it is required to secure the lens diameter, and hence the thickness of the lens becomes disadvantageously thicker. When the ratio exceeds the upper limit of the conditional expression (10), the movement amount of the sixth lens unit B6 toward the object side becomes larger, and the interval between the sixth lens unit B6 and the fifth lens unit B5 becomes smaller, and hence the effect of correcting curvature of field by the sixth lens unit B6 becomes disadvantageously smaller.

The conditional expression (11) defines a ratio of the combined focal length of the fourth lens unit B4 to the sixth lens unit B6 at the wide angle end to the focal length of the zoom lens. When the ratio falls below the lower limit of the conditional expression (11), the combined focal length of a lens system of the fourth lens unit B4 to the sixth lens unit B6 becomes much shorter, and it becomes difficult to correct curvature of field over the entire zoom range.

When the ratio exceeds the upper limit of the conditional expression (11), the combined focal length of the lens system of the fourth lens unit B4 to the sixth lens unit B6 becomes longer, and it is required to strengthen the refractive powers of the second lens unit B2 and the third lens unit B3 to increase the magnification-varying action of those lens units. Then, sensitivities of aberration correction and manufacturing over the entire zoom range become disadvantageously higher.

It is more preferred to set the numerical value range of the conditional expressions (4) to (11) as follows:

$$0.37 < ESW < 0.50 \quad (4a);$$

$$0.6 < EST < 1.0 \quad (5a);$$

$$1.5 < EST/ESW < 2.1 \quad (6a);$$

$$0.7 < \beta 5t/\beta 5w < 0.9 \quad (7a);$$

$$-1.3 < (R5a+R5b)/(R5a-R5b) < 0.1 \quad (8a);$$

$$|f5/|f6|| < 0.8 \quad (9a);$$

$$-0.08 < M6/M5 < 0.55 \quad (10a); \text{ and}$$

$$2.0 < f456w/fw < 2.8 \quad (11a).$$

Next, a digital still camera in an embodiment of the present invention, which uses the zoom lens described in each of Embodiments as a photographing optical system, is described with reference to FIG. 13.

In FIG. 13, the digital still camera includes a camera main body 20, and an image pickup optical system 21 formed of any one of the zoom lenses described in Embodiments 1 to 6. An image pickup element (photoelectric conversion element) 22 is included in the camera main body, and is a CCD sensor, a CMOS sensor, or other such element configured to receive an object image formed by the image pickup optical system 21. A memory 23 stores information corresponding to the object image photoelectrically converted by the image pickup element 22. A viewfinder 24 is formed of a liquid crystal display panel or other such device, and is used to observe the object image formed on the image pickup element 22.

Through application of the zoom lens according to one of Embodiments of the present invention to the digital still camera or other such image pickup apparatus as described above, the image pickup apparatus including the zoom lens having a high magnification while having the small size and high performance is implemented.

Next, the numerical value data sets 1 to 6 corresponding to Embodiments 1 to 6, respectively, are shown. In each numerical value data set, the order of an optical surface from the object side is represented by "i". A curvature radius of the i-th optical surface (i-th surface) is represented by "ri", and an interval between the i-th surface and the (i+1)th surface is represented by "di". A refractive index and an Abbe number of a material of an optical member between the i-th surface and the (i+1)th surface with respect to the d-line are represented by "ndi" and "vdi", respectively. In addition, an eccentricity is represented by "k", aspherical coefficients are represented by A4, A6, A8, A10, and A12, and a displacement in the optical axis direction at a position of a height "h" from the optical axis with respect to a surface apex is represented by "x". At this time, an aspherical shape is expressed by the following expression:

$$x = (h^2/R)/[1+[1-(1+k)(h/R)^2]^{1/2}] + A4h^4 + A6h^6 + A8h^8 + A10h^{10} + A12h^{12}$$

where R represents a paraxial curvature radius. Further, for example, the expression of "e-Z" means "×10$^{-z}$".

In each numerical data set, the last two surfaces arranged on the image side are surfaces of a filter, a face plate, or other such optical block. In each of Embodiments, a back focus (BF) is an air-equivalent distance from a lens surface closest to the image side of a lens unit having a refractive power and arranged closest to the image side to a paraxial image plane. Correspondences between each numerical data set and the above-mentioned conditional expressions are shown in Table 1.

(Numerical Data 1)

| Surface data | | | | | |
|---|---|---|---|---|---|
| Surface number | r | d | nd | vd | Effective diameter |
| 1 | 37.151 | 0.94 | 1.94595 | 18.0 | 25.60 |
| 2 | 24.501 | 4.00 | 1.83481 | 42.7 | 24.20 |
| 3 | 464.594 | (Variable) | | | 23.80 |
| 4* | 81.489 | 0.80 | 1.85135 | 40.1 | 17.90 |
| 5* | 10.845 | 3.63 | | | 13.90 |
| 6 | −36.207 | 0.55 | 1.88300 | 40.8 | 13.40 |
| 7 | 51.803 | 0.05 | | | 12.90 |
| 8 | 24.890 | 1.95 | 1.95906 | 17.5 | 12.70 |
| 9 | −59.241 | 0.85 | | | 12.30 |
| 10 | −18.622 | 0.48 | 1.83481 | 42.7 | 12.10 |
| 11 | −170.046 | (Variable) | | | 11.80 |
| 12 (Stop) | ∞ | (Variable) | | | 10.66 |
| 13* | 13.205 | 2.84 | 1.85135 | 40.1 | 12.50 |

-continued

| | | | | | |
|---|---|---|---|---|---|
| 14* | −65.920 | 0.10 | | | 12.20 |
| 15 | 12.908 | 2.40 | 1.69560 | 59.0 | 11.30 |
| 16 | −112.947 | 0.45 | 1.85478 | 24.8 | 10.50 |
| 17 | 8.595 | 3.06 | | | 9.40 |
| 18 | ∞ | (Variable) | | | 9.55 |
| 19 | 15.384 | 2.65 | 1.49700 | 81.5 | 13.00 |
| 20 | −245.545 | (Variable) | | | 13.10 |
| 21* | 34.013 | 1.63 | 1.69350 | 53.2 | 13.50 |
| 22 | −359.894 | (Variable) | | | 13.50 |
| 23 | −18.832 | 0.55 | 1.83400 | 37.2 | 13.30 |
| 24 | 1,227.789 | 0.05 | | | 13.90 |
| 25* | 19.939 | 1.74 | 1.85135 | 40.1 | 14.60 |
| 26* | 56.757 | (Variable) | | | 14.70 |
| 27 | ∞ | 1.20 | 1.51633 | 64.1 | 20.00 |
| 28 | ∞ | 1.00 | | | 20.00 |
| Image plane | ∞ | | | | |

Aspherical surface data

Fourth surface

K = 0.00000e+000    A4 = 2.69158e−005    A6 = −5.77703e−007
A8 = 5.17084e−009   A10 = −1.99660e−011

Fifth surface

K = −2.62355e+000   A4 = 2.93046e−004    A6 = −6.56326e−007
A8 = −5.66088e−009  A10 = 3.48742e−010   A12 = −2.40954e−012

Thirteenth surface

K = 0.00000e+000    A4 = −5.30279e−005   A6 = 1.85678e−007
A8 = −6.76788e−009  A10 = 9.67026e−011   A12 = −1.01646e−012

Fourteenth surface

K = 0.00000e+000    A4 = 2.61158e−005    A6 = 1.14861e−007
A8 = −2.47715e−009

Twenty-first surface

K = 0.00000e+000    A4 = −1.53755e−005   A6 = −4.72127e−007
A8 = 5.77504e−009   A10 = −5.21317e−011

Twenty-fifth surface

K = 0.00000e+000    A4 = −1.45109e−004   A6 = 1.04644e−006
A8 = −3.87583e−009  A10 = 8.94086e−012

Twenty-sixth surface

K = 0.00000e+000    A4 = −1.07404e−004   A6 = 7.43851e−007

Various data
Zoom ratio 4.71

| | Wide angle | Intermediate | Telephoto |
|---|---|---|---|
| Focal length | 9.06 | 19.01 | 42.70 |
| F-number | 1.85 | 2.54 | 2.88 |
| Half angle of view (degrees) | 35.52 | 21.72 | 10.47 |
| Image height | 6.47 | 7.57 | 7.89 |
| Total lens length | 60.62 | 63.51 | 74.90 |
| BF | 3.77 | 8.13 | 7.81 |
| d3 | 0.38 | 7.33 | 18.48 |
| d11 | 12.05 | 1.99 | 0.35 |
| d12 | 4.30 | 4.54 | 0.55 |
| d18 | 3.94 | 2.50 | 1.00 |
| d20 | 4.13 | 5.71 | 9.53 |
| d22 | 2.91 | 4.37 | 8.05 |
| d26 | 1.98 | 6.16 | 6.02 |

(Numerical Data 2)

Surface data

| Surface number | r | d | nd | vd | Effective diameter |
|---|---|---|---|---|---|
| 1 | 30.710 | 0.85 | 1.95906 | 17.5 | 25.20 |
| 2 | 20.927 | 4.38 | 1.83481 | 42.7 | 23.70 |
| 3 | 209.495 | (Variable) | | | 23.10 |
| 4 | 114.307 | 0.60 | 1.80400 | 46.6 | 17.50 |
| 5 | 10.031 | 3.68 | | | 13.50 |
| 6* | −49.811 | 0.50 | 1.85135 | 40.1 | 12.80 |
| 7* | 38.370 | 0.05 | | | 12.30 |
| 8 | 22.886 | 1.74 | 1.95906 | 17.5 | 12.20 |
| 9 | −109.634 | 0.82 | | | 11.80 |
| 10 | −21.900 | 0.40 | 1.83481 | 42.7 | 11.50 |
| 11 | ∞ | (Variable) | | | 11.20 |
| 12 (Stop) | ∞ | (Variable) | | | 10.14 |
| 13* | 15.517 | 2.31 | 1.76802 | 49.2 | 12.10 |
| 14* | −66.096 | 0.10 | | | 12.00 |
| 15 | 13.213 | 2.30 | 1.88300 | 40.8 | 11.40 |
| 16 | −267.189 | 0.40 | 1.85478 | 24.8 | 10.80 |
| 17 | 9.452 | 2.22 | | | 9.70 |
| 18 | ∞ | (Variable) | | | 9.46 |
| 19 | 19.414 | 2.15 | 1.59282 | 68.6 | 13.10 |
| 20 | −388.457 | (Variable) | | | 13.10 |
| 21* | 36.272 | 1.58 | 1.55332 | 71.7 | 13.80 |
| 22 | −101.493 | (Variable) | | | 13.90 |
| 23 | −19.241 | 0.50 | 1.80518 | 25.4 | 14.00 |
| 24 | 69.918 | 0.05 | | | 14.80 |
| 25* | 16.052 | 2.87 | 1.85135 | 40.1 | 16.40 |
| 26 | 85.135 | (Variable) | | | 16.30 |
| 27 | ∞ | 1.20 | 1.51633 | 64.1 | 20.00 |
| 28 | ∞ | 1.00 | | | 20.00 |
| Image plane | ∞ | | | | |

Aspherical surface data

Sixth surface

K = 0.00000e+000    A4 = −4.65934e−006   A6 = 4.38122e−008
A8 = −6.81216e−009  A10 = −2.18082e−011

Seventh surface

K = 0.00000e+000    A4 = −9.12074e−006   A6 = 1.49732e−007
A8 = −5.99692e−009  A10 = −8.49470e−011

Thirteenth surface

K = 0.00000e+000    A4 = −4.11100e−005   A6 = 1.81977e−007
A8 = 1.03650e−009   A10 = 1.88368e−011

Fourteenth surface

K = 0.00000e+000    A4 = 2.16197e−005    A6 = 7.33267e−008
A8 = 3.42534e−009

Twenty-first surface

K = 0.00000e+000    A4 = −2.60024e−005   A6 = −2.22120e−007
A8 = 4.76418e−010   A10 = −1.80435e−011

Twenty-fifth surface

K = 0.00000e+000    A4 = −4.90844e−005   A6 = 2.81810e−007
A8 = 1.83805e−010   A10 = −8.25789e−012

Various data
Zoom ratio 4.71

| | Wide angle | Intermediate | Telephoto |
|---|---|---|---|
| Focal length | 9.06 | 20.04 | 42.70 |
| F-number | 1.85 | 2.54 | 2.88 |
| Half angle of view (degrees) | 35.52 | 20.70 | 10.47 |
| Image height | 6.47 | 7.57 | 7.89 |
| Total lens length | 61.46 | 64.88 | 72.89 |
| BF | 4.25 | 8.33 | 5.40 |
| d3 | 0.70 | 7.15 | 16.68 |
| d11 | 9.67 | 0.46 | 0.45 |
| d12 | 6.14 | 5.05 | 0.45 |
| d18 | 5.95 | 4.83 | 1.00 |
| d20 | 4.27 | 6.88 | 13.39 |
| d22 | 2.57 | 4.27 | 7.62 |
| d26 | 2.46 | 6.54 | 3.61 |

(Numerical Data 3)

Surface data

| Surface number | r | d | nd | vd | Effective diameter |
|---|---|---|---|---|---|
| 1 | 34.208 | 0.94 | 1.95906 | 17.5 | 25.10 |
| 2 | 22.715 | 3.80 | 1.88300 | 40.8 | 23.30 |
| 3 | 192.857 | (Variable) | | | 22.80 |
| 4* | 245.905 | 0.80 | 1.85135 | 40.1 | 18.70 |
| 5* | 11.533 | 3.40 | | | 14.20 |
| 6 | −68.365 | 1.00 | 1.92286 | 18.9 | 13.70 |
| 7 | −31.499 | 0.94 | | | 13.40 |
| 8 | −15.186 | 0.49 | 1.80400 | 46.6 | 13.00 |
| 9 | 39.856 | 0.10 | | | 12.60 |
| 10 | 29.223 | 1.33 | 1.94595 | 18.0 | 12.60 |
| 11 | −1,104.115 | (Variable) | | | 12.40 |
| 12 (Stop) | ∞ | (Variable) | | | 10.88 |
| 13* | 16.899 | 2.67 | 1.76802 | 49.2 | 12.70 |
| 14* | −54.781 | 0.10 | | | 12.60 |
| 15 | 10.406 | 2.28 | 1.60311 | 60.6 | 11.70 |
| 16 | 32.635 | 0.45 | 1.85478 | 24.8 | 11.00 |
| 17 | 9.102 | 3.18 | | | 10.10 |
| 18 | ∞ | (Variable) | | | 10.15 |
| 19 | 21.136 | 2.95 | 1.49700 | 81.5 | 14.00 |
| 20 | −43.045 | (Variable) | | | 14.20 |
| 21* | 34.989 | 1.58 | 1.76802 | 49.2 | 14.60 |
| 22 | 286.445 | (Variable) | | | 14.60 |
| 23 | −23.907 | 0.53 | 1.76182 | 26.5 | 14.20 |
| 24 | 44.669 | 0.05 | | | 14.70 |
| 25* | 18.603 | 2.15 | 1.85135 | 40.1 | 15.30 |
| 26* | 77.395 | (Variable) | | | 15.40 |
| 27 | ∞ | 1.20 | 1.51633 | 64.1 | 20.00 |
| 28 | ∞ | 1.00 | | | 20.00 |
| Image plane | ∞ | | | | |

Aspherical surface data

Fourth surface

K = 0.00000e+000  A4 = 6.73021e−005  A6 = −6.32712e−007
A8 = 5.37667e−009  A10 = −1.81487e−011

Fifth surface

K = −5.09661e+000  A4 = 4.72341e−004  A6 = −3.82321e−006
A8 = 4.93153e−008  A10 = −2.74191e−010  A12 = 2.82116e−012

Thirteenth surface

K = 0.00000e+000  A4 = −2.35365e−005  A6 = 4.97735e−007
A8 = −1.19326e−008  A10 = 2.23624e−010  A12 = −1.70892e−012

Fourteenth surface

K = 0.00000e+000  A4 = 3.18170e−005  A6 = 1.82901e−007
A8 = −6.56881e−010

Twenty-first surface

K = 0.00000e+000  A4 = −7.47329e−006  A6 = −5.74378e−009
A8 = −1.42226e−009  A10 = 1.62652e−011

Twenty-fifth surface

K = 0.00000e+000  A4 = −2.83957e−005  A6 = −4.73380e−007
A8 = 3.65458e−010  A10 = −2.01983e−011

Twenty-sixth surface

K = 0.00000e+000  A4 = 1.51821e−005  A6 = −7.27323e−007

Various data
Zoom ratio 4.71

| | Wide angle | Intermediate | Telephoto |
|---|---|---|---|
| Focal length | 9.06 | 19.00 | 42.70 |
| F-number | 1.85 | 2.54 | 2.88 |
| Half angle of view (degrees) | 35.52 | 21.73 | 10.47 |
| Image height | 6.47 | 7.57 | 7.89 |
| Total lens length | 64.74 | 66.70 | 76.00 |
| BF | 4.67 | 8.93 | 7.79 |
| d3 | 0.38 | 7.08 | 17.14 |
| d11 | 13.11 | 3.52 | 0.45 |
| d12 | 4.88 | 3.76 | 0.55 |
| d18 | 5.45 | 3.48 | 1.00 |
| d20 | 4.39 | 8.29 | 14.61 |
| d22 | 2.72 | 2.49 | 5.31 |
| d26 | 2.88 | 7.14 | 6.00 |

(Numerical Data 4)

Surface data

| Surface number | r | d | nd | vd | Effective diameter |
|---|---|---|---|---|---|
| 1 | 31.980 | 0.85 | 1.94595 | 18.0 | 25.00 |
| 2 | 23.269 | 3.95 | 1.76385 | 48.5 | 24.00 |
| 3 | 212.933 | (Variable) | | | 23.50 |
| 4 | 116.967 | 0.56 | 1.77250 | 49.6 | 18.50 |
| 5 | 11.100 | 4.47 | | | 14.60 |
| 6* | −22.449 | 0.40 | 1.55332 | 71.7 | 14.00 |
| 7 | 21.206 | 0.06 | | | 13.20 |
| 8 | 19.038 | 1.24 | 1.94595 | 18.0 | 13.20 |
| 9 | 40.549 | (Variable) | | | 13.00 |
| 10 (Stop) | ∞ | (Variable) | | | 10.66 |
| 11* | 15.860 | 2.44 | 1.82080 | 42.7 | 12.70 |
| 12* | −86.678 | 0.10 | | | 12.60 |
| 13 | 12.480 | 2.39 | 1.59522 | 67.7 | 11.80 |
| 14 | 99.885 | 0.45 | 1.85478 | 24.8 | 11.00 |
| 15 | 10.318 | 2.33 | | | 10.10 |
| 16 | ∞ | (Variable) | | | 9.89 |
| 17 | 20.775 | 2.19 | 1.71300 | 53.9 | 14.60 |
| 18 | −439.854 | (Variable) | | | 14.60 |
| 19* | 50.598 | 1.83 | 1.49710 | 81.6 | 14.30 |
| 20 | −42.568 | (Variable) | | | 14.20 |
| 21 | −18.473 | 0.55 | 1.80810 | 22.8 | 13.90 |
| 22 | −244.725 | 0.10 | | | 14.50 |
| 23* | 22.243 | 1.78 | 1.85135 | 40.1 | 15.30 |
| 24 | 85.135 | (Variable) | | | 15.30 |
| 25 | ∞ | 1.20 | 1.51633 | 64.1 | 20.00 |
| 26 | ∞ | 1.00 | | | 20.00 |
| Image plane | ∞ | | | | |

Aspherical surface data

Sixth surface

K = 0.00000e+000  A4 = −1.91937e−006  A6 = −1.36820e−007
A8 = 7.77174e−010  A10 = −4.38820e−012

Eleventh surface

K = 0.00000e+000  A4 = −2.50305e−005  A6 = −2.36043e−008

Twelfth surface

K = 0.00000e+000  A4 = 1.65996e−005  A6 = 1.94702e−008
A8 = −2.62546e−010

Nineteenth surface

K = 0.00000e+000  A4 = −1.93284e−005  A6 = −1.62168e−007
A8 = −5.78277e−011  A10 = 7.96367e−013

Twenty-third surface

K = 0.00000e+000  A4 = −3.65896e−005  A6 = −2.29863e−008
A8 = 3.86575e−009  A10 = −3.92077e−011

Various data
Zoom ratio 4.71

| | Wide angle | Intermediate | Telephoto |
|---|---|---|---|
| Focal length | 9.06 | 20.00 | 42.70 |
| F-number | 1.85 | 2.54 | 2.88 |
| Half angle of view (degrees) | 35.52 | 20.74 | 10.47 |
| Image height | 6.47 | 7.57 | 7.89 |
| Total lens length | 66.25 | 66.99 | 75.68 |
| BF | 5.88 | 10.22 | 5.40 |
| d3 | 0.38 | 7.02 | 18.70 |

-continued

| | | | |
|---|---|---|---|
| d9 | 13.14 | 1.73 | 0.97 |
| d10 | 6.73 | 4.83 | 0.15 |
| d16 | 7.85 | 5.77 | 1.00 |
| d18 | 3.59 | 7.63 | 14.14 |
| d20 | 2.57 | 3.69 | 9.22 |
| d24 | 4.09 | 8.43 | 3.61 |

(Numerical Data 5)

Surface data

| Surface number | r | d | nd | vd | Effective diameter |
|---|---|---|---|---|---|
| 1 | 35.016 | 0.94 | 1.92286 | 18.9 | 25.60 |
| 2 | 24.636 | 3.83 | 1.77250 | 49.6 | 23.90 |
| 3 | 524.381 | (Variable) | | | 23.40 |
| 4* | 83.629 | 0.80 | 1.85135 | 40.1 | 18.10 |
| 5* | 10.976 | 3.86 | | | 14.00 |
| 6 | −30.948 | 0.55 | 1.88300 | 40.8 | 13.40 |
| 7 | 35.243 | 0.05 | | | 12.90 |
| 8 | 23.631 | 2.04 | 2.00272 | 19.3 | 12.80 |
| 9 | −58.394 | 1.09 | | | 12.40 |
| 10 | −15.888 | 0.48 | 1.65412 | 39.7 | 12.20 |
| 11 | −65.214 | (Variable) | | | 11.80 |
| 12 (Stop) | ∞ | (Variable) | | | 11.25 |
| 13* | 14.254 | 2.68 | 1.85135 | 40.1 | 12.80 |
| 14* | −111.678 | 0.10 | | | 12.60 |
| 15 | 13.796 | 2.36 | 1.80400 | 46.6 | 11.80 |
| 16 | −195.297 | 0.45 | 1.85478 | 24.8 | 11.30 |
| 17 | 8.907 | 3.23 | | | 10.10 |
| 18 | ∞ | (Variable) | | | 10.23 |
| 19 | 22.877 | 2.27 | 1.49700 | 81.5 | 13.40 |
| 20 | −90.500 | (Variable) | | | 13.60 |
| 21* | 35.992 | 1.63 | 1.76802 | 49.2 | 15.10 |
| 22 | 434.059 | (Variable) | | | 15.10 |
| 23 | −90.713 | 0.55 | 1.95906 | 17.5 | 15.30 |
| 24 | 63.503 | 0.05 | | | 15.40 |
| 25* | 22.714 | 1.78 | 1.85135 | 40.1 | 15.70 |
| 26* | 77.395 | (Variable) | | | 15.70 |
| 27 | ∞ | 1.20 | 1.51633 | 64.1 | 20.00 |
| 28 | ∞ | 1.00 | | | 20.00 |
| Image plane | ∞ | | | | |

Aspherical surface data

Fourth surface

K = 0.00000e+000　A4 = 4.19738e−005　A6 = −5.52495e−007
A8 = 4.65748e−009　A10 = −1.88768e−011

Fifth surface

K = −1.97595e+000　A4 = 2.40351e−004　A6 = 1.46776e−007
A8 = −7.54743e−009　A10 = 3.88383e−010　A12 = −3.00886e−012

Thirteenth surface

K = 0.00000e+000　A4 = −4.11176e−005　A6 = 3.62581e−007
A8 = −1.09746e−008　A10 = 7.46484e−011　A12 = −8.64287e−013

Fourteenth surface

K = 0.00000e+000　A4 = 2.02770e−005　A6 = 2.96434e−007
A8 = −8.55398e−009

Twenty-first surface

K = 0.00000e+000　A4 = −1.07827e−005　A6 = −9.18784e−008
A8 = 2.14774e−009　A10 = −1.28231e−011

Twenty-fifth surface

K = 0.00000e+000　A4 = −8.35025e−005　A6 = 4.26152e−007
A8 = −1.61929e−009　A10 = −6.48141e−013

Twenty-sixth surface

K = 0.00000e+000　A4 = −6.48281e−005　A6 = 5.25379e−007

-continued

Various data
Zoom ratio 4.71

| | Wide angle | Intermediate | Telephoto |
|---|---|---|---|
| Focal length | 9.06 | 19.00 | 42.70 |
| F-number | 1.86 | 2.54 | 2.88 |
| Half angle of view (degrees) | 35.52 | 21.73 | 10.47 |
| Image height | 6.47 | 7.57 | 7.89 |
| Total lens length | 64.32 | 67.49 | 81.63 |
| BF | 6.55 | 7.12 | 7.23 |
| d3 | 0.38 | 7.13 | 18.39 |
| d11 | 11.97 | 2.90 | 0.35 |
| d12 | 5.30 | 2.81 | 0.56 |
| d18 | 4.27 | 4.77 | 1.00 |
| d20 | 4.49 | 2.97 | 11.85 |
| d22 | 2.20 | 10.64 | 13.11 |
| d26 | 4.76 | 5.33 | 5.44 |

(Numerical Data 6)

Surface data

| Surface number | r | d | nd | vd | Effective diameter |
|---|---|---|---|---|---|
| 1 | 38.292 | 0.94 | 1.94595 | 18.0 | 25.70 |
| 2 | 25.320 | 4.00 | 1.83481 | 42.7 | 24.60 |
| 3 | 548.892 | (Variable) | | | 24.20 |
| 4* | 80.887 | 0.80 | 1.85135 | 40.1 | 17.90 |
| 5* | 10.835 | 3.57 | | | 13.90 |
| 6 | −39.238 | 0.55 | 1.88300 | 40.8 | 13.40 |
| 7 | 48.662 | 0.05 | | | 12.90 |
| 8 | 23.994 | 1.93 | 1.95906 | 17.5 | 12.70 |
| 9 | −67.714 | 0.90 | | | 12.30 |
| 10 | −18.567 | 0.48 | 1.83481 | 42.7 | 12.00 |
| 11 | −170.195 | (Variable) | | | 11.70 |
| 12 (Stop) | ∞ | (Variable) | | | 10.66 |
| 13* | 13.292 | 2.85 | 1.85135 | 40.1 | 12.60 |
| 14* | −62.944 | 0.10 | | | 12.30 |
| 15 | 12.849 | 2.43 | 1.69560 | 59.0 | 11.30 |
| 16 | −106.992 | 0.45 | 1.85478 | 24.8 | 10.50 |
| 17 | 8.587 | 3.06 | | | 9.40 |
| 18 | ∞ | (Variable) | | | 9.55 |
| 19 | 15.325 | 2.55 | 1.49700 | 81.5 | 13.00 |
| 20 | −1,681.932 | (Variable) | | | 13.00 |
| 21* | 36.298 | 1.73 | 1.72903 | 54.0 | 13.80 |
| 22 | −145.333 | (Variable) | | | 13.80 |
| 23 | −18.822 | 0.55 | 1.90043 | 37.4 | 13.40 |
| 24 | −772.324 | 0.05 | | | 13.90 |
| 25* | 20.207 | 1.75 | 1.85135 | 40.1 | 14.70 |
| 26* | 56.757 | (Variable) | | | 14.70 |
| 27 | ∞ | 1.20 | 1.51633 | 64.1 | 20.00 |
| 28 | ∞ | 1.00 | | | 20.00 |
| Image plane | ∞ | | | | |

Aspherical surface data

Fourth surface

K = 0.00000e+000　A4 = 2.71243e−005　A6 = −5.75446e−007
A8 = 5.18260e−009　A10 = −2.06527e−011

Fifth surface

K = −2.62097e+000　A4 = 2.94628e−004　A6 = −6.65731e−007
A8 = −5.22277e−009　A10 = 3.65141e−010　A12 = −2.74055e−012

Thirteenth surface

K = 0.00000e+000　A4 = −5.21935e−005　A6 = 1.81936e−007
A8 = −7.42691e−009　A10 = 1.09338e−010　A12 = −1.22463e−012

Fourteenth surface

K = 0.00000e+000　A4 = 2.66571e−005　A6 = 1.12403e−007
A8 = −3.08743e−009

-continued

Twenty-first surface

K = 0.00000e+000  A4 = −1.52341e−005  A6 = −4.32015e−007
A8 = 5.95260e−009  A10 = −5.82937e−011

Twenty-fifth surface

K = 0.00000e+000  A4 = −1.50082e−004  A6 = 1.11431e−006
A8 = −5.09258e−009  A10 = 2.73515e−011

Twenty-sixth surface

K = 0.00000e+000  A4 = −1.19959e−004  A6 = 8.25203e−007

Various data
Zoom ratio 4.71

|  | Wide angle | Intermediate | Telephoto |
|---|---|---|---|
| Focal length | 9.06 | 19.11 | 42.70 |
| F-number | 1.85 | 2.54 | 2.88 |
| Half angle of view (degrees) | 35.52 | 21.62 | 10.47 |
| Image height | 6.47 | 7.57 | 7.89 |
| Total lens length | 60.62 | 63.80 | 75.96 |
| BF | 3.77 | 8.05 | 8.00 |
| d3 | 0.38 | 7.35 | 18.93 |
| d11 | 12.05 | 2.86 | 0.35 |
| d12 | 4.27 | 3.58 | 0.55 |
| d18 | 3.98 | 2.64 | 1.35 |
| d20 | 4.04 | 5.60 | 9.30 |
| d22 | 2.98 | 4.58 | 8.32 |
| d26 | 1.98 | 6.26 | 6.21 |

TABLE 1

| | Conditional expressions | Embodiment 1 | Embodiment 2 | Embodiment 3 | Embodiment 4 | Embodiment 5 | Embodiment 6 |
|---|---|---|---|---|---|---|---|
| (1) | f5/fw | 4.952 | 5.350 | 5.710 | 5.165 | 5.628 | 4.413 |
| (2) | Fnow * D5iw/Lw | 0.328 | 0.359 | 0.337 | 0.358 | 0.370 | 0.334 |
| (3) | M5/Lw | 0.152 | 0.102 | 0.089 | 0.094 | 0.181 | 0.159 |
| (4) | ESW | 0.399 | 0.380 | 0.388 | 0.442 | 0.380 | 0.449 |
| (5) | EST | 0.805 | 0.602 | 0.613 | 0.663 | 0.674 | 0.923 |
| (6) | EST/ESW | 2.016 | 1.504 | 1.500 | 1.501 | 1.774 | 2.056 |
| (7) | β5t/β5w | 0.770 | 0.846 | 0.878 | 0.832 | 0.709 | 0.726 |
| (8) | (R5a + R5b)/(R5a − R5b) | −0.827 | −0.473 | −1.278 | 0.086 | −1.181 | −0.600 |
| (9) | f5/|f6| | 0.757 | 0.477 | 0.721 | 0.545 | 0.051 | 0.766 |
| (10) | M6/M5 | 0.440 | 0.187 | 0.546 | −0.077 | 0.058 | 0.442 |
| (11) | f456w/fw | 2.621 | 2.591 | 2.642 | 2.427 | 2.472 | 2.659 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-245013, filed Dec. 21, 2017, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power;
   a fourth lens unit having a positive refractive power;
   a fifth lens unit having a positive refractive power; and
   a sixth lens unit,
   wherein the first lens unit is configured to move toward the object side for zooming from a wide angle end to a telephoto end, and an interval between each pair of adjacent lens units is changed for zooming,
   wherein, when a focus sensitivity ESW of the fifth lens unit at the wide angle end when the zoom lens is focused at infinity is expressed as:

$ESW = (1 - \beta 5w^2) \times \beta 6w^2$, where β5w represents a lateral magnification of the fifth lens unit at the wide angle end when the zoom lens is focused at infinity, and β6w represents a lateral magnification of the sixth lens unit at the wide angle end when the zoom lens is focused at infinity, and a focus sensitivity EST of the fifth lens unit at the telephoto end when the zoom lens is focused at infinity is expressed as:

$EST = (1 - \beta 5t^2) \times \beta 6t^2$, where β5t represents a lateral magnification of the fifth lens unit at the telephoto end when the zoom lens is focused at infinity, and β6t represents a lateral magnification of the sixth lens unit at the telephoto end when the zoom lens is focused at infinity,
   wherein the fifth lens unit is configured to move for focusing, and
   wherein the following conditional expressions are satisfied:

$2.0 < f5/fw < 10.0$;

$0.1 < Fnow \times D5iw/Lw < 0.8$;

$0.05 < M5/Lw < 0.30$; and $1.5 < EST/ESW < 5.0$.

where fw represents a focal length of the zoom lens at the wide angle end, f5 represents a focal length of the fifth lens unit, Fnow represents an F-number of the zoom lens at the wide angle end, Lw represents a total length of the zoom lens at the wide angle end, D5iw represents a distance from a lens surface on the object side of the fifth lens unit to an image plane at the wide angle end when the zoom lens is focused at infinity, and M5 represents a movement amount of the fifth lens unit for zooming from the wide angle end to the telephoto end when the zoom lens is focused at infinity.

2. The zoom lens according to claim 1, wherein the following conditional expression is satisfied:

$0.3 < ESW < 0.7$.

3. The zoom lens according to claim 1, wherein the following conditional expression is satisfied:

$0.6 < EST < 1.2$.

4. The zoom lens according to claim 1, wherein the following conditional expression is satisfied:

$0.5 < \beta 5t/\beta 5w < 1.0$.

5. The zoom lens according to claim 1, wherein the following conditional expression is satisfied:

$$-1.5 < (R5a+R5b)/(R5a-R5b) < 0.5,$$

where R5a represents a curvature radius of a lens surface closest to the object side in the fifth lens unit, and R5b represents a curvature radius of a lens surface closest to the image side in the fifth lens unit.

6. The zoom lens according to claim 1, wherein the fifth lens unit consists of one lens component.

7. The zoom lens according to claim 6, wherein the one lens component has an aspherical surface.

8. The zoom lens according to claim 1, wherein the following conditional expression is satisfied:

$$|f5/f6| < 1.0,$$

where f6 represents a focal length of the sixth lens unit.

9. The zoom lens according to claim 1, wherein the following conditional expression is satisfied:

$$-0.1 M6/M5 < 0.6,$$

where M6 represents a movement amount of the sixth lens unit for zooming from the wide angle end to the telephoto end when the zoom lens is focused at infinity.

10. The zoom lens according to claim 1, wherein the following conditional expression is satisfied:

$$1.5 < f456w/fw < 3.5,$$

where f456w represents a combined focal length of the fourth lens unit, the fifth lens unit, and the sixth lens unit at the wide angle end when the zoom lens is focused at infinity.

11. The zoom lens according to claim 1, wherein the fifth lens unit is configured to move toward the object side for focusing from infinity to close distance.

12. An image pickup apparatus comprising:
a zoom lens; and
an image pickup element configured to receive an image formed by the zoom lens,
wherein the zoom lens includes, in order from an object side to an image side:
a first lens unit having a positive refractive power;
a second lens unit having a negative refractive power;
a third lens unit having a positive refractive power;
a fourth lens unit having a positive refractive power;
a fifth lens unit having a positive refractive power; and
a sixth lens unit,
wherein the first lens unit is configured to move toward the object side for zooming from a wide angle end to a telephoto end, and an interval between each pair of adjacent lens units is changed for zooming,
wherein, when a focus sensitivity ESW of the fifth lens unit at the wide angle end when the zoom lens is focused at infinity is expressed as:

$$ESW = (1-\beta 5w^2) \times \beta 6w^2,$$

where β5w represents a lateral magnification of the fifth lens unit at the wide angle end when the zoom lens is focused at infinity, and β6w represents a lateral magnification of the sixth lens unit at the wide angle end when the zoom lens is focused at infinity, and a focus sensitivity EST of the fifth lens unit at the telephoto end when the zoom lens is focused at infinity is expressed as:

$$EST = (1-\beta 5t^2) \times \beta 6t^2,$$

where β5t represents a lateral magnification of the fifth lens unit at the telephoto end when the zoom lens is focused at infinity, and β6t represents a lateral magnification of the sixth lens unit at the telephoto end when the zoom lens is focused at infinity,
wherein the fifth lens unit is configured to move for focusing, and
wherein the following conditional expressions are satisfied:

$$2.0 < f5/fw < 10.0;$$

$$0.1 < Fnow*D5iw/Lw < 0.8;$$

$$0.05 < M5/Lw < 0.30; \text{ and}$$

$$1.5 < EST/ESW < 5.0.$$

where fw represents a focal length of the zoom lens at the wide angle end, f5 represents a focal length of the fifth lens unit, Fnow represents an F-number of the zoom lens at the wide angle end, Lw represents a total length of the zoom lens at the wide angle end, D5iw represents a distance from a lens surface on the object side of the fifth lens unit to an image plane at the wide angle end when the zoom lens is focused at infinity, and M5 represents a movement amount of the fifth lens unit for zooming from the wide angle end to the telephoto end when the zoom lens is focused at infinity.

13. A zoom lens comprising, in order from an object side to an image side:
a first lens unit having a positive refractive power;
a second lens unit having a negative refractive power;
a third lens unit having a positive refractive power;
a fourth lens unit having a positive refractive power;
a fifth lens unit having a positive refractive power; and
a sixth lens unit having a negative refractive power,
wherein the first lens unit is configured to move toward the object side for zooming from a wide angle end to a telephoto end, and an interval between each pair of adjacent lens units is changed for zooming,
wherein the fifth lens unit is configured to move for focusing, and
wherein the following conditional expressions are satisfied:

$$2.0 < f5/fw < 10.0;$$

$$0.1 < Fnow \times D5iw/Lw < 0.8; \text{ and}$$

$$0.05 < M5/Lw < 0.30,$$

where fw represents a focal length of the zoom lens at the wide angle end, f5 represents a focal length of the fifth lens unit, Fnow represents an F-number of the zoom lens at the wide angle end, Lw represents a total length of the zoom lens at the wide angle end, D5iw represents a distance from a lens surface on the object side of the fifth lens unit to an image plane at the wide angle end when the zoom lens is focused at infinity, and M5 represents a movement amount of the fifth lens unit for zooming from the wide angle end to the telephoto end when the zoom lens is focused at infinity.

14. A zoom lens comprising, in order from an object side to an image side:
a first lens unit having a positive refractive power;
a second lens unit having a negative refractive power;
a third lens unit having a positive refractive power;
a fourth lens unit having a positive refractive power;
a fifth lens unit having a positive refractive power; and
a sixth lens unit,
wherein the first lens unit is configured to move toward the object side for zooming from a wide angle end to a telephoto end, and an interval between each pair of adjacent lens units is changed for zooming, wherein the fifth lens unit is configured to move for focusing, and wherein the following conditional expressions are satisfied:

$$2.0 < f5/fw < 10.0;$$

$$0.1 < Fnow \times D5iw/Lw < 0.8;$$

$$0.05 < M5/Lw < 0.30, \text{ and}$$

$$-1.5 < (R5a+R5b)/(R5a-R5b) < 0.5,$$

where fw represents a focal length of the zoom lens at the wide angle end, f5 represents a focal length of the fifth lens unit, Fnow represents an F-number of the zoom lens at the wide angle end, Lw represents a total length of the zoom lens at the wide angle end, D5$iw$ represents a distance from a lens surface on the object side of the fifth lens unit to an image plane at the wide angle end when the zoom lens is focused at infinity, M5 represents a movement amount of the fifth lens unit for zooming from the wide angle end to the telephoto end when the zoom lens is focused at infinity, R5$a$ represents a curvature radius of a lens surface closest to the object side in the fifth lens unit, and R5$b$ represents a curvature radius of a lens surface closest to the image side in the fifth lens unit.

15. A zoom lens comprising, in order from an object side to an image side:

a first lens unit having a positive refractive power;
a second lens unit having a negative refractive power;
a third lens unit having a positive refractive power;
a fourth lens unit having a positive refractive power;
a fifth lens unit having a positive refractive power; and
a sixth lens unit, wherein the first lens unit is configured to move toward the object side for zooming from a wide angle end to a telephoto end, and an interval between each pair of adjacent lens units is changed for zooming, wherein the fifth lens unit consists of one lens component, wherein the fifth lens unit is configured to move for focusing, and wherein the following conditional expressions are satisfied:

$$2.0 < f5/fw < 10.0;$$

$$0.1 < Fnow \times D5iw/Lw < 0.8;$$

$$0.05 < M5/Lw < 0.30,$$

where fw represents a focal length of the zoom lens at the wide angle end, f5 represents a focal length of the fifth lens unit, Fnow represents an F-number of the zoom lens at the wide angle end, Lw represents a total length of the zoom lens at the wide angle end, D5$iw$ represents a distance from a lens surface on the object side of the fifth lens unit to an image plane at the wide angle end when the zoom lens is focused at infinity, and M5 represents a movement amount of the fifth lens unit for zooming from the wide angle end to the telephoto end when the zoom lens is focused at infinity.

* * * * *